United States Patent
Gorina et al.

(10) Patent No.: US 6,875,532 B2
(45) Date of Patent: Apr. 5, 2005

(54) METHOD FOR MANUFACTURING A SINGLE HIGH-TEMPERATURE FUEL CELL AND ITS COMPONENTS

(76) Inventors: Liliya Fedorovna Gorina, 109439,ul.Yolgigradskii prospekt, 140-2-26 Moscow (RU); Vladimir Vladimirovich Sevastyanov, 115541, ul. Luganskaya, 3-26-270 Moscow (RU); Vladimir Vitalievich Morozov, 115682, ul. Kustanaiskaya, 5-3-503 Moscow (RU); Sergei Vasilievich Nikitin, 115562,ul.Marshala Zakharova, 17-1-135 Moscow (RU); Alexander Sergeevich Lipilin, 620146,ul.Volgogradskaya, d.45,kv.67 Ekaterinburg (RU); Igor Vladimirovich Rodionov, 140011,ul.Moskovskaya, d.3a, kv.16 g.Ljubertsy (RU); Alexander Vladimirovich Sevastyanov, 117292,ul.Ivana Babushkina, 12-2-55 Moscow (RU); Jury Grigorievich Yatluk, 620141, Teplokhodnyi proezd, d.7,kv.132 g.Ekaterinburg (RU)

( * ) Notice: Subject to any disclaimer, the term of this patent is extended or adjusted under 35 U.S.C. 154(b) by 63 days.

(21) Appl. No.: 10/010,083

(22) Filed: Nov. 9, 2001

(65) Prior Publication Data
US 2002/0122967 A1 Sep. 5, 2002

Related U.S. Application Data

(63) Continuation of application No. 09/308,013, filed as application No. PCT/RU97/00159 on May 23, 1997.

(30) Foreign Application Priority Data
Nov. 11, 1996 (WO) .............................. PCT/RU96/00319

(51) Int. Cl.[7] .......................... H01M 8/10; H01M 4/86; H01M 4/90; H01M 6/00
(52) U.S. Cl. .............................. 429/30; 429/31; 429/33; 429/40; 29/623.5
(58) Field of Search .............................. 429/30, 31, 33, 429/40, 44; 29/623.5

(56) References Cited

U.S. PATENT DOCUMENTS

| | | |
|---|---|---|
| 4,076,899 A | 2/1978 | Kring |
| 4,816,036 A * | 3/1989 | Kotchick ..................... 427/115 |

(Continued)

FOREIGN PATENT DOCUMENTS

| | | |
|---|---|---|
| DE | 41 29 553 A1 | 6/1993 |
| EP | 0 014 596 A1 | 8/1980 |
| EP | 0 467 692 A2 | 1/1992 |
| EP | 0 519 681 A2 | 12/1992 |
| EP | 0 524 013 A1 | 1/1993 |
| EP | 0 525 844 B1 | 2/1993 |
| GB | 1379 277 | 1/1975 |
| RU | 2050642 C1 | 12/1995 |
| RU | 2064210 C1 | 7/1996 |

*Primary Examiner*—L. Edmondson
(74) *Attorney, Agent, or Firm*—Knobbe, Martens, Olson & Bear, LLP

(57) ABSTRACT

This invention relates to prospective electric energy sources to be employed in both mobile and stationery high-power electric stations. A method is disclosed for manufacturing a High Temperature Fuel Cell (HTFC), and the associated components, having a solid oxide electrolyte, and designed to transform chemical energy directly into electrical power. The disclosed method for manufacturing an HTFC and its components employs a narrow class of organic reagents which are well known, and widely used in the art. The manufacturing and assembly is performed within the framework of a single physical/chemical process and uniform technological equipment.

55 Claims, 11 Drawing Sheets

U.S. PATENT DOCUMENTS

| | | | |
|---|---|---|---|
| 4,895,576 A | * | 1/1990 | Pal et al. .................... 429/30 |
| 5,061,402 A | * | 10/1991 | Olson et al. ........... 204/290.06 |
| 5,114,702 A | | 5/1992 | Pedersen et al. |
| 5,141,825 A | * | 8/1992 | Jensen .................... 29/623.5 |
| 5,143,751 A | * | 9/1992 | Richards et al. ............. 75/343 |
| 5,227,258 A | | 7/1993 | Ito et al. |
| 5,277,996 A | * | 1/1994 | Marchetti et al. ............. 429/30 |
| 5,281,490 A | | 1/1994 | Nishioka et al. |
| 5,286,322 A | * | 2/1994 | Armstrong et al. ......... 252/373 |
| 5,298,469 A | * | 3/1994 | Haig et al. .................. 508/280 |
| 5,364,522 A | * | 11/1994 | Wang ........................ 427/214 |
| 5,436,091 A | | 7/1995 | Shackle et al. |
| 5,453,330 A | | 9/1995 | Kawasaki et al. |
| 5,474,800 A | * | 12/1995 | Matsuzaki ................. 427/115 |
| 5,504,195 A | * | 4/1996 | Leedham et al. ........ 427/248.1 |
| 5,516,597 A | * | 5/1996 | Singh et al. ................. 429/309 |
| 5,521,020 A | | 5/1996 | Dhar |
| 5,534,468 A | | 7/1996 | Stephenson |
| 5,681,797 A | * | 10/1997 | Lawate ....................... 508/280 |
| 5,702,837 A | * | 12/1997 | Xue ............................. 429/40 |
| 5,866,275 A | * | 2/1999 | Kawasaki et al. ........ 427/248.1 |
| 5,919,587 A | * | 7/1999 | Mukherjee et al. ......... 429/213 |
| 5,977,017 A | | 11/1999 | Golden |
| 5,984,997 A | * | 11/1999 | Bickmore et al. ............. 75/343 |
| 6,013,313 A | * | 1/2000 | Nunan et al. ............... 427/214 |
| 6,017,647 A | * | 1/2000 | Wallin ......................... 429/30 |
| 6,033,632 A | | 3/2000 | Schwartz et al. |
| 6,040,077 A | * | 3/2000 | Debe et al. ............ 204/290.06 |
| 6,080,357 A | * | 6/2000 | Sugikawa ..................... 419/2 |
| 6,093,234 A | * | 7/2000 | Zhen et al. .................... 501/82 |
| 6,099,960 A | | 8/2000 | Tennent et al. |
| 6,136,412 A | | 10/2000 | Spiewak et al. |
| 6,146,549 A | * | 11/2000 | Mackay et al. ............. 252/373 |
| 6,183,914 B1 | * | 2/2001 | Yao et al. .................... 429/309 |

\* cited by examiner

METHOD FOR MANUFACTURING A SINGLE HIGH-TEMPERATURE FUEL CELL AND ITS COMPONENTS

This application is a continuation application of U.S. patent application Ser. No. 09/308,013, filed May 11, 1999 which is a U.S. national phase under 35 U.S.C. §371 of International Application No. PCT/RU97/00159, filed May 23, 1997, which claims priority to Russian application RU 96/00319, filed Nov. 11, 1996.

FIELD OF THE INVENTION

This invention relates generally to the field of direct conversion of chemical energy into electrical power, and more particularly, to high-temperature electrochemical devices (HTECD) with solid oxide electrolytes (SOE) which may be used for manufacturing high-temperature fuel cells (HTFC) components thereof.

BACKGROUND OF THE INVENTION

High-temperature fuel cells are currently among the most promising sources of electrical power both in mobile systems and stationary high-power electric stations. Additionally, HTFCs are being considered as an alternative to nuclear power.

One important feature of HTFCs is the ability for the direct conversion of the chemical energy stored in several fuel types into electric energy. Due to this direct conversion, the HTFC cycle does not fall under Carnot cycle limitations, and thus it is theoretically possible to achieve a cycle efficiency of up to 80%. Currently, some experimental specimens have achieved an efficiency of 50%, and efficiency values of up to 65–70% are anticipated in the near future. Moreover, when compared with conventional methods for generating electricity, fuel cells have a number of other advantages including: design modularity, high efficiency under partial electrical load, the possibility for the combined generation of electric and thermal energy, several orders lower contaminant product output than current widely used energy sources, and an absence of moving parts and units.

Recently, much research and development has been under way in the area of the internationally classified high-temperature solid oxide fuel cells (SOFC). SOFCs have a number of apparent advantages over other fuel cell types. These advantages may include: usage of cheap oxide materials for the electrodes, absence of liquid circulation i.e. a solid electrolyte, and the absence of liquids within the fuel cells. The utilization of solid oxide electrolyte in ceramic fuel cells eliminates the need for monitoring the electrolyte and excludes material corrosion problems normally incurred from the use of a liquid electrolyte. Conventional ceramic fuel cells operate at high temperatures (over 600° C.). It is desirable for fuel cells to operate at high working temperatures, the elevated temperature increases the reaction rate, allowing the cell to convert a hydrocarbon fuel within the cell into energy (internal reforming) and to generate high-potential heat suitable for regeneration and utilization in the main cycle. Thus, power plants based on certain ceramic fuel cells can be simple and more effective than many other known techniques of producing electrical and thermal energy. Moreover, since all components of the HTFCs are in a solid state, the ceramic fuel cells, for example, can be formed into ultra-thin layers, and the cell's elements can be shaped into unique forms unachievable in liquid electrolyte fuel cell systems.

On the other hand, the ceramic fuel cells place increased requirements on the materials and techniques used in manufacturing their components. Production of ceramic powders and the development of methods for forming ceramic powders play key roles in the technology of ceramic fuel cells.

The main components of the ceramic fuel cell are the electrolyte, the anode, the cathode, and the current passage. Within the fuel cell each component performs several functions and has to meet certain requirements including: feature stability (chemical, phase, structural and dimensional) in oxidizing and/or restorative media, a chemical compatibility with other components, and a proper conductivity. Additionally, the components of ceramic fuel cells must have similar thermal expansion coefficients in order to eliminate peeling and destruction during the manufacturing process and in operation. The electrolyte and the current passage must be sufficiently dense in order to prevent the mixing of gases in the anode and cathode spaces, while the anode and the cathode must be porous enough to provide gas transport to the reaction location and to facilitate the removal of the reaction products.

In addition to the above mentioned requirements, the cell components must possess a high strength and resistivity while enabling the possibility for a simple and cheap method for cell manufacture. Moreover, methods for manufacturing the components of ceramic fuel cells must be compatible, because cell manufacturing conditions cannot be divided and independent for each component. For example, if the components are manufactured and joined one by one, then the caking temperature of each subsequent component must be equal to or lower that of the caking temperature of the previous component, in order to avoid a change in the microstructure of the previous component. If the components are formed in raw form, then all components must be caked at the same temperature modes. Moreover, the components of the ceramic fuel cell must be compatible not only at operational temperatures but also at higher temperatures at which the forming of ceramic structures takes place.

The current technologies for manufacturing HTFCs and their components which are being widely used, in general, meet oil tile chemical stability, thermal resistivity, electrical and other features requirements. Component compositions are mainly the ceramic materials based on zirconium dioxide, oxides of cerium, thorium, barium, strontium, bismuth, compounds of perovskite type materials based on oxides of chromium, manganese, cobalt, nickel, and lanthanum modified by magnesium, calcium, strontium, barium, scandium, yttrium, cerium and other lanthanides. In the technology of manufacturing the materials for the HTFCs, all known methods for manufacturing ceramic materials are applicable. However, increasing and complicated specific demands made on HTFC construction, such as:

the predetermined porosity of the ceramic electrodes with sufficient structural strength and electrical conductivity;

and decreasing the thickness of the electrolyte film while maintaining the gas density and as a consequence; and the necessity to form thin electrolyte films on the porous carrier electrodes with a maximum increase of a specific working surface per 111-FC weight unit;

substantially limit the application of known ceramic technologies and materials when forming HTFC components such as the electrodes, the electrolytes, and the current passages.

One of the limitations is conditioned by great differences in caking temperatures of the materials, at which the HTFC components being mated are manufactured. For example, the caking of the 10YSZ electrolyte takes place at a temperature of 1700° C., while the carrier cathode of lanthanum-strontium-$La_{0.7}Sr_{0.3}MnO_3$ is caked at 1450° C. At the same time the specific caking temperatures for every material are necessary to fully stabilize the characteristics used in the HTFCs. Therefore, special methods for forming the solid oxide electrolytes and the electrodes developed recently appear to be inefficient. These methods are based generally on maximizing an increase of the powder's activity in order to decrease the differential between the caking temperatures of electrolytes and electrodes. In reality, these methods succeed in forming the surfaces of the HTFC contacts i.e. cathode/electrolyte/anode, but at temperatures ranging from 100–400° C. lower than the usual ones. However, materials incorporated herein which prove to be sufficiently active, continuously change toward the final phase structure during the article exploitation from 900°–1100° C. This change may be accompanied by irregular shrinkages of various HTFC components, and increased mutual diffusion between components, which may lead to component failure or to unacceptable decreases in desired article features.

Certain ceramic technologies such as isostatic pressuring, extrusion, plasma spraying, vacuum spraying etc. used in forming HTFC components from powders can be modified using additional techniques, such as increasing the electrolyte density, providing the determined porosity, or increasing the adhesion of the elements to be mated, to utilize the active powders either during the process of forming the components itself or at other points in the manufacturing process.

A method for manufacturing the HTFC includes the steps of applying consecutively a fuel electrode layer, an electrolyte layer of YSZ, and an air electrode layer, to make a three layer element on a carrier substrate made of the CSZ is well known in the art. The thermal expansion coefficient of the substrate is matched to the thermal expansion coefficient of the applied electrolyte layer by exposing the substrate to a thermal treatment during the application step. The thermal treatment is performed by heating at the rate of 50° C. per hour until attaining 1450° C., holding at 1450° C. for 6 hours before decreasing at the same rate. (U.S. Pat. No. 5,021,304, Int. Cl. H01M 8/10, H01M 4/86, published 1991).

When manufacturing the HTFC according to U.S. Pat. No. 5,021,304, a wide range of initial substances and compounds may be used. The manufacture of the individual components of an HTFC is performed by various technologies, which finally complicates the process of manufacturing the HTFC as a whole and particularly complicates its hardware realization.

An alternative to the given method of forming HTFC components, certain technologies may use processes based on pyrolysis of metals combined with various organic reagents containing the elements to be incorporated into the components.

By analyzing technical decisions, one may make the conclusion that the role of the organic reagents in manufacturing the electrolytes and the electrodes is similar to that regarding the caking (forming) temperature decrease. However, this role is opposite regarding the desirable final result, since the electrolyte must be gas-dense, and the electrode must be porous. After performing this analysis, a tendency develops to use different classes of organic substances, which ultimately leads to inevitable widening in the range of substances and materials used, and subsequently a rise in the cost of manufacturing the HTFC as a whole.

Thus, if β-diketones are mainly used in the methods for forming the electrolyte, the other various classes of organic substances: alcohols, carbonic acids, amines, and many other (including easily inflammable) ones are used in the methods for forming the electrodes.

In this context, the process for manufacturing the materials for forming any HTFC components must be universal and fit within the limits of the processes and equipment used in manufacturing both the materials themselves and the HTFC components based on these materials, thereby significantly reducing the article cost, the range of used materials and substances, and the amount of technological equipment used.

The ceramic cathode can be the carrier construction base of the HTFC. The following main requirements are placed on the carrier cathode of the fuel cell:

the overall cathode porosity and the cathode pore size must provide a free supply of oxygen-containing gas to the three-phase cathode/electrolyte/gas border;

a sufficient mechanical strength in order to provide reliable long-term operation of the fuel cell;

the thermal expansion coefficient (TEC) of the cathode must be approximately that of the TEC of the solid electrolyte, in order to avoid the occurrence of mechanical stresses leading to a failure in the solid electrolyte layer.

The first two requirements appear to contradict each other, therefore the problem of finding a compromise always exists in practice.

The third requirement is mainly provided for by carefully choosing the correct materials. For example, oxide compounds of La, Mn, Cr, Co, or Ni doped with oxides from the group including Mg, Ca, SY, or Ba are used as a material for manufacturing the cathode.

Considering the manufacturing requirements and the high working temperatures (on the order of 1000° C.), the YSZ-based SOFC comprised of noble metals or oxide compounds can be used for manufacturing the cathodes. However, due to their high cost, the noble metals such as platinum, palladium, and silver are practically used in SOFCs for research purposes only. Most recently, doped lanthanum manganite $LaMnO_3$ became the most widely used material for these purposes.

As it was mentioned above, the choice of the material for manufacturing the porous cathode is performed according to its conductivity, TEC and other features. In so doing, a temperature for the preliminary burning (synthesis) of the selected material is predetermined (i.e., stipulated temperature at which the material obtains a necessary phase composition) and cannot be changed over a wide range. This, in its turn, does not allow the diffusion and strength characteristics of the porous carrier cathode to vary. Moreover, caking at high temperatures assumes higher power expenses for manufacturing the fuel cells.

It is known from the prior art, that methods for manufacturing the electrodes differ depending on the HTFC construction.

In constructions with the carrier electrolyte, the manufacturing of the electrodes (in most cases) consists of applying a thin-dispersed suspension of material in some solvent such as alcohol, acetone etc. onto the electrolyte surface, then burning at a temperature which will provide reliable adhesion of the electrode material to the electrolyte. The application of the electrode mass onto the electrolyte surface can also be performed by painting, dipping or spraying. Other methods of manufacturing the electrode include: chemically condensing the carrier solid electrolyte onto the surface from liquid solutions or gaseous phase materials; thermal decomposition of metal salts; joint hot-compacting the electrode material and the electrolyte; or by spraying [M. V. Perfiliev, A. K. Demin, B. L. Kuzin, A. S. Lipilin, "Hightemperature gas electrolysis", Moscow, Nauka, 1988, p. 98].

In constructions with the carrier electrode, the electrodes are manufactured from the specially prepared formable masses using various possible forming techniques including: extrusion, single-axis or isostatic compacting, or a casting.

A method for manufacturing the tubular carrier electrode for the solid oxide electrolyte of an electrochemical fuel cell is most similar to the claimed group of inventions in the aspect of manufacturing the cathode by the technical essence and achieved result. The method comprises steps of: dry mixing the powders of $MnO_2$, $CaCO_3$ and $La_2O_3$ (in order to obtain the lanthanum manganite ($LaMnO_3$) doped with calcium after the caking); compacting the obtained mixture into briquettes; synthesizing the compacted briquettes at high temperature by means of caking; further grinding the briquettes until obtaining a powder with a predetermined size of particles; mixing the prepared powder with removable items: a plasticizer, a pore creating agent, and a water-soluble substance in order to obtain a formable mass; forming this mass into thin-walled tubes; and finally caking these tubes (U.S. Pat. No. 5,108,850, Int. Cl. H01M 4/88, published in 1992).

Besides limitations inherent to known similar designs, the solid-phase synthesis used in the technology protected by this patent does not provide the homogenous characteristics of the powder. Moreover, it contemplates the usage of the plasticizer, pore-creating agent, and water-soluble substance. The caking process is performed at high temperatures with significant shrinkages, thereby requiring additional techniques to obtain articles of a required size, i.e. the technology is sufficiently labor-consuming and power intensive.

Current high-temperature fuel cells having solid oxide electrolytes can be divided into two classes 1) conduction by oxygen ions and 2) conduction by hydrogen ions (protons). Among the many high-temperature solid electrolytes being researched, two types are considered promising because of their physical and chemical characteristics and chemical composition:

an electrolyte with ionic oxygen conductivity on the basis of a modified zirconium dioxide;

an electrolyte with ionic proton conductivity on the basis of a modified barium cerate (or strontium cerate).

Currently, many firms are working on ways of manufacturing from 1 to 10 k W generators including: Westinghouse Electric Corp. (USA), Fuji Electric Co-(Japan Asea Brown Boveri AG (Germany), NGK Insulators Ltd. (Japan), Mitsubishi (Japan), Osaka Gas Co. (Japan), Allied-Signal Inc. (USA), Siemens AG (Germany), and International Fuel Cell Corp-(USA) etc.

Enthusiasm, and attention to this problem are generated by potential physical and chemical characteristics inherent in solid electrolytes and, therefore may be realized in electrochemical devices.

Currently, the HTFC based on zirconium dioxide in the tubular embodiment is theoretically the closest to an industrial realization. Currently, research and experimentation is being performed on the modified barium (strontium) cerate HTFC within the promising context of the proton electrolyte. This is confirmed by an analysis of the state of the art including scientific works dedicated to the proton electrolyte, and its wide discussion at international scientific seminars and conferences. On certain samples of thin-film ($\sigma$=10–15 $\mu$m), proton electrolytes with a current density of 0.3 A per cub. cm at 0.4 V and 600° C. was achieved. These values are about three times higher than those obtained with a zirconium dioxide based electrolyte under the same conditions, which is in fact explained by the extremely low polarizability of the conventional electrodes in contact with these ceramics and at a lower activation energy than that of the zirconium electrolyte at 800° C.

However, it is necessary to note that realization of the above-mentioned advantages of the electrochemical systems on a high level seems to be possible only when solving a problem common for all options: the problem of mastering the latest technologies, both in manufacturing the necessary ceramic materials, and in utilizing these materials during the process of manufacturing the HTFC itself. The most labor intensive problem is to create a technology of applying gas-dense layers ($\sigma$ is equal of 1 to 40 $\mu$m) of electrolytes on the carrier (both gas-dense and porous). The thin-film, design has a particular significance for the construction of the proton electrolytes, because in this case the main disadvantages come from resistive loss, and the substantially lower mechanical strength of the $BaCeO_3$ ceramic electrolyte, as compared to that of $ZrO_2$. Therefore this material cannot simultaneously perform the two functions of the carrier element construction material and the electrolyte.

The technical problems of manufacturing a thin-film electrolyte are complemented by the high cost of the manufacturing technology. Thus, even if all technical problems were solved, the technology would contemplate the maintenance of parameters in order to obtain reproducible characteristics, for example, to control the temperature to within an accuracy of 2 degrees, would require an unacceptably expensive and possibly unreliable technology.

Currently known methods for two-stage high-temperature synthesis of oxide powder materials for manufacturing the thin-film electrolytes have been found to be unacceptable. Ultra-disperse powders which are nearly uniform by chemical composition and are used in forming electrolyte layers from 1 to 40 $\mu$m in width, require technologies without an intermediate step of powder preparation.

Methods without the steps of manufacturing and caking the solid electrolyte powders are known in the art. For example, in EVD technology used by Westinghouse, the step of synthesizing the solid electrolyte on the porous surface of the carrier cathode is performed from the decomposition of gaseous reagents, such as halogenides of zirconium and yttrium, onto the cathode. An advantage of this method is that layer forming may initialize with the participation of gas-phase molecular free particles. This solves the gas density problem. However, the necessity to use unique equipment and the necessity to work with caustic gas media such as halogenide compounds makes such technology unprofitable (U.S. Pat. No. 5,085,742, Int. Cl. H01M 6/00, H01M 8/00, published 1992). Another disadvantage of the CVD (EVD) method is the natural disproportion of the mixture of gas phases of the zirconium tetrachloride and yttrium trichloride during the process of their application onto the substrate. As a result, the yttrium within the applied electrolyte is non-uniformly distributed, and has a concentration gradient from the boundary within the substrate to the surface of the layer. Moreover, the cubic structure of zirconium dioxide (its monoclinic phase) appears not to allow the manufacture of the gas-dense electrolyte layer, with resistant characteristics, during the operation.

Another method for manufacturing components known in the art employs the organic compounds of elements such as Zr, Y, etc., for forming the electrolyte and organic compounds of elements such as La, Mn, Sr, etc., for forming the cathode, current passage, and anode etc. These compounds are easily disassociated under heating, thereby allowing the forming of HTFC components at relatively low temperatures—below 600° C., and can be utilized in inert media or oxygen-containing air, under standard atmospheric pressure without intermediate steps of applying the porous electrolyte layer, for example, by plasma spraying.

It follows from the analysis of publications and patent literature that methods for applying metal oxides from their organic compounds which were previously used only for obtaining the protective coatings over construction materials are being developed currently for tile solid oxide electrolytes and electrodes (Kuntagai Tozhija, Johota Hvozhi, Shindon Juji, Kondo Wakicki, Muzita Suzumu, Dyanki naganu oyobl kogyo butsuri kaganu; Anform water. Energy Theory Life. 1987, 55, No.3, pp. 269–270 [Obtaining the thin oxide films of perovskite type by pyrolysis of organic acids salts]; M. V. Perfiliev, A. K. Demin, B. L. Kuzin, A. S. Lipilin, "High-temperature gas electrolysis", Moscow, Nauka, 1988, p.98; GB patent No 136198, C1. C1A, 1974; Japanese patent application No. 62-235475, 1987, Int. Cl. C23C 20/08, C03C 17/25) [Collection of scientific materials edited by acad. Spitsin V.1. "Composition, features and application of β-diketonates of metals", Moscow, Nauka, 1978, pp.116–119][1]; Katrin NordVarhaug, Chun-hua Chen, Frik M. Kelder, Frans P. E. van Berkil and Joop Schoonman, "Thin Film Techniques for Solid Electrolyte Composites" European solid oxide fuel cell forum. May 6–10, 1996. Oslo/Norway. pg. 331–340 [2]; European patent No 0478185, Int. Cl. 6 H01M 8/12, HO1 M 4/86, published in 1991).

In the art of manufacturing electrolytes, a process for forming oxide film coatings during a thermal decomposition of acetylacetonates of, for example, Zr, Ce etc. is highly desirable. In so doing, forming oxide compounds having cubic structures due to the carbon stabilization is preferable. The cubic structure of the carbon-stabilized zirconium dioxide is stable in atmospheric air at temperatures up to 900° C. When the temperature exceeds this point the cubic form is transformed to a monoclinic one, due to the carbon's partial oxidation to CO and $CO_2$. In derivatographic analysis, the authors of [1] were able to obtain a fully stabilized zirconium dioxide (CSZ) by way of joint dissociation of β-diketonates of the zirconium and cerium (with pivaloil-trifluorine-acetonate).

With respect to the method for manufacturing the electrolyte by technical essence and the result achieved in service, the method for manufacturing the Zr/Y film electrolyte by electrostatic application of a gas-drop emulsion of β-diketonates (ESD) to a medium, is the most similar to the claimed group of the inventions. The process is performed using acetylacetonates of the zirconium and yttrium (Zr $(O_2C_5H_7)_4$, Alfa/Y$(O_2C_5H_7)_3$, Alfa) [2]. The essence of the method is in spraying the gas-drop emulsion of β-diketonates mixture in a closed chamber. The substrate placed in the chamber is electrostatically charged up to 8–10 kV, and is heated to temperatures ranging from 250 to 430° C. As a result, the emulsion drops fall on the substrate and are thermally decomposed, creating the YSZ film on the surface.

In utilizing the ESD method it is necessary to use metal helates, namely acetylacetonates, having a high melting-point of 194° C. Therefore, it is necessary to dissolve acetylacetonates in ethanol, butyl-carbitol or other solvents, which do not allow a higher than 0.05 mole per cub. dm. concentration of zirconium dioxide in solution. Such low concentration limits the rate of film application to the level of 2 $\mu$m per hour. Moreover, since helate ligands are strongly coupled with the metal atom, the decay of zirconium acetylacetonate occurs via an intermediate product having a polymeric structure. This product is destroyed not with the segregation of, but with the destruction of whole helate ligands, and residues of their carbon chains compete in the crystal lattice of zirconium dioxide with yttrium oxide. Thus, with the $Y_2O_3$ removed, the zirconium dioxide is partially stabilized by residues of the carbon chains which are released from the crystal lattice of the zirconium dioxide in the form of CO and $CO_2$ during further burning, and this results in forming a certain amount (3–4%) of a monoclinic structure in addition to the inevitable forming of pores.

As it was mentioned above, the current passage is one of the main HTFC components. Among the list of the requirements and characteristics that a current passage used in an HTFC should meet, the main requirement is a high electrical conductivity both in oxidizing and restorative atmospheres. Such characteristics may be achieved preferably by current passages manufactured to include noble metals or noble-metal based alloys. Such as the current passage disclosed in U.S. Pat. No 3,457,052 (Int. Cl. B21b, B21c, published in 1969). Considering the high cost of these materials, wide scale manufacturing of this type of current passages is practically impossible.

The current passages made of electric conductive materials on the basis of metal oxides and their compositions are more promising. These compositions include doped lanthanum chromite ($LaCrO_3$), since it is sufficiently resistant both in an oxidizing medium or oxygen-containing space and in a restorative medium of the fuel gas.

One of the requirements placed upon a material used in a current passage made of $LaCrO_3$ and used in SOFCs, is its gas-density. This will help to avoid any cross-leakage of fuel and oxidizing gases through the current passage. It is known, that it is difficult to manufacture the $LaCrO_3$ with high density in conditions of high oxygen activity. In so doing, temperatures above 1600° C. are necessary. Such high caking temperatures become unacceptable when heating the $LaCrO_3$ together with other SOFC components. But introducing a fusible substance to improve the caking temperatures in the form of a second phase with a significantly lower melting point (about 1400° C.), makes the $LaCrO_3$ more dense in oxidizing media. However, this method for decreasing the caking point is unacceptable, since it produces loss of liquid-phase fusible eutectics into other components of the fuel cell causing substance and morphology changes leading to the loss of fuel cell's functional characteristics.

With respect to the method for manufacture of a current passage by the technical essence and the result achieved in service, the method including steps of synthesizing a powder of electron-conducting material based on doped lanthanum chromite, and further, thermally spraying the commutation layer of this material onto the unmasked sector of the air electrode is the most similar to the claimed group of the inventions (U.S. Pat. No. 5,085,742, Int. Cl. H01M 6/00, H01M 8/00, published in 1992).

The current passages manufactured according to that technology have lost a number of known inherent disadvantages for above mentioned reasons. Along with that, complicated technological equipment leading to a substantial rise in the cost of the whole article is necessary in order to manufacture a current passage of sufficient gas-density from lanthanum chromite by the given method.

The main physical and chemical processes take place on the interface surfaces of the high-temperature electrochemical devices, enabling the operation of the device as a whole.

A chemical composition of single HTFC layers including a positive electrode, an electrolyte, and a negative electrode (PEN), is usually selected according to maximum electric (electronic, ionic) conductivity. In general, this selection rarely coincides with other functionally necessary requirements to the materials, for example, chemical and thermal stability, constructional strength etc.

On the interface surfaces between the electrodes and the electrolyte, chemical interactions are possible in working temperature conditions or during the process of manufacturing. Thus, on the LSM/YSZ boundary, a formation of the lanthanum zirconate $La_2Zr_2O_7$ occurrs, leading to a sharp increase in the contact resistance and to a deterioration of cathode operation. ([Andreas Mitterdorfer et al. ETN Zurich "Department of materials, Swiss Technology Institute"], Second ESOFC Forum Oslo (Norway), May 1996, pp. 373–382).

A promising use of the modified cerium oxide having an ionic conductivity higher than that of the modified zirconium dioxide, is as the electrolyte. However, in the restorative fuel medium, the cerium oxide has noticeable electronic conductivity, which may lead to the decrease of the EMF (voltage of an interrupted circuit of PEN) by 20–30% (M. Sahibzada et al., Department of materials and department of chemical engineering technology, Imperial college of science, technology and medicine, London, Second ESOFC Forum Oslo (Norway), May 1996, pp. 687–696).

Currently, manganite doped with strontium or lanthanum is one of the most promising materials for an air electrode. However, since it is easily restored with a sharp increasing of the TEC from $12.5*10^{-6}$ to $14.5*10^{-6}$ $K^{-1}$ even in a slightly restorative medium, its application is possible only with absolutely dense layers of the solid electrolyte. Any local decreased density in the electrolyte being in contact with MLS leads rapidly to the destruction of the whole element. Since current techniques display a tendency to decrease the electrolyte thickness (to 5 $\mu$m and below), there is a great probability for the existence of local microdefects.

In order to solve the problem of effective service material mating, and also of increasing material stability when in gas media operation, it is necessary to form special intermediate layers, or interface layers, on the interface surfaces. As a rule, the thickness of interface layers doesn't exceed units of micrometers.

The creation of such thin interface layers imposes special requirements on the technology used to form them. Until 1994, two processes could be considered the most acceptable: an electrochemical application from the vapor-gas phase (EGP), and a magnetron spraying (both are derived from the technology for epitaxial layer growth in the integrated circuit industry). Both techniques are economically unprofitable in HTECD production due to the expensive equipment and high operation expenses necessary for their practical implementation.

Among the cheaper technological processes, a pyrolysis dissociation of metal-organic complexes, metal-organic compounds, or their mixtures is the most promising. An electrostatic pyrolysis spraying (EPS) is one variation, being the most similar to the present group of the invention with respect to manufacturing the interface layer [2].

The second electrode of HTFC is the anode, which, as a rule, is manufactured from the cermet.

On the basis of the above-mentioned requirements imposed on electrodes and caused both by the technologies for their manufacturing, and by operating conditions, it can be established that the most significant among these requirements is the selection of the material used for the anode manufacturing. In so doing the following circumstances are taken into account:

Because of the restorative conditions in the fuel gas atmosphere, metals are used as an anode material for SOFC. Since the material composition may change during the operation of the fuel cell, the used metals should not be oxidized both in pure fuel conditions and in maximum oxidation conditions of the fuel during output from the fuel device.

Under operation temperatures in the range of 700° to 100° C. in the SOFC with a solid electrolyte, the list of used metals is limited, in general, by the nickel, cobalt and noble metals. The nickel is the most common due to its low cost (as compared to cobalt, platinum etc.).

In order to obtain the cermet anode with a porous structure operating over a long period of time at 700–1000° C., the nickel in the form of metal is usually used together with the stabilized zirconium dioxide and also with the stabilized cerium oxide, which is necessary for additional (internal) reforming of the fuel gas.

A substrate of an ion-conductive ceramic material keeps metallic nickel particles, and prevents the caking of metal particles at the operation temperatures of the fuel cell.

When manufacturing the anode cermet for the SOFC, it is usual to begin with powder materials such as YSZ and NiO. The mixture is may be formed into a compact electrode by different methods. Further, the NiO will be restored to the nickel metal under the effect of the fuel cell. For thin layers (for example, 100 $\mu$m in thickness) of the nickel cermet annealed in air, several minutes are necessary to complete the restoration process for the NiO at temperatures around 1000° C.

The method for manufacturing the cermet fuel electrode is the most similar to the present invention in the manufacturing aspect of the cermet fuel electrode. The method comprises steps of:

applying a separate electron-conductive layer onto the external porous electrode coupled to the solid ion-conductive electrolyte which, in its turn, is in contact with the internal electrode, injecting into the external porous electrode a mixture consisting mainly of a salt containing a first metal, the metal containing component being chosen from the group including nickel, cobalt, and their mixture, and the salt being chosen from the group including nitrate, acetate, propyonate, butyrate, and their mixture, or from their mixture mainly consisting of a salt containing a second metal, the metal component being chosen from the group containing cerium, strontium titanate, and their mixture, and the salt being chosen from the group containing nitrate, acetate, propyonate, butyrate, their mixture, and also a non-ionized surface-active substance.

heating the applied mixture in the atmosphere up to a sufficient temperature for forming a separate solid porous electron-conductive, multi-phase layer mainly consisting of a conductive oxide chosen from the group containing cerium oxide, strontium titanate, and their mixture. The thin metal particles contained in it being preferably chosen from the group consisting of separate nickel particles, separate cobalt particles, and their mixture; the particles being from 0.05 to 1.75 $\mu$m in diameter.

In addition, an external porous electrode contains large metal particles from 3 to 35 $\mu$m in diameter. The electrode is partially introduced into the structure of the substrate including the stabilized zirconium dioxide portion, and the thin metal particles which range from 0.25 to 0.75 μm in diameter.

In addition, dopants used with the second metal contained in the salt are selected from the group, including Mg, Sr, Ba, La, Cc, Pr, Nd, Sm, Eu, Gd, Th, Dy, Ho, Er, Tm, Yb, Y, Al, and their mixtures. A method for their heating, performed at the rate of 50 to 100° C. per hour, is disclosed in U.S. Pat. No. 5,021,304 (Int. Cl. H01 M 8/10, published in 1991).

A disadvantage of the this method for anode manufacturing is its multiple stages and large number and great variety of classes of utilized organic reagents. The proposed invention provides for a fuel electrode using a single physical/chemical process during a single operation with a single class of organic reagents, namely, a mixture of dimethyl-carbonic acids, where the straight carbon chain can be represented as a row from $C_1$ to $C_{12}$. Such combination of carbonic acids is the cheapest and the most wide-spread in the industrial-scale production of organic reagents.

An electrical insulating layer is a necessary element of the HTFC construction. In order to operate the HTFC it is necessary to provide electrical insulation between the electrolyte, anode and current passage. The electrical insulating material in the HTFC construction contacts the electrolyte and the anode and cathode materials. In this connection, the most strict requirements are imposed on contacts of the electrically insulating material, which relies on the fact that such contacts must maintain certain mechanical and gas-density requirements under operating conditions and must exclude the interaction of the materials which may lead to the loss of HTFC serviceability.

The most common requirements placed on the electrically insulating material are the stability of its structure, high temperature material characteristics, reliable contact with interfaced materials, an absence of the interaction in the contact zone, and a TEC value in proximity to the value of the interfaced material TEC.

Ceramic materials based on the magnesium spinel $Al_2O_3$ and/or MgO have acceptable insulating features (DE Patent No. 2756172. Int. Cl. 6, C25B 9/04 published in 1979).

Solid electrolytes based on zirconium dioxide are characterized by a sufficiently low electric conductivity with acceptable levels of the stabilizing additives and chemical compounds of zirconium; for example, zirconates, which determine the possibility of their usage as electrically insulating materials. In addition, their TEC values coincide well with the TEC value of the solid zirconium electrolytes.

Under working temperatures conditions for HTFC operation, the doped magnesium spinels possess many desirable characteristics, including good electrical insulating characteristics. As a rule, doping is performed in order to bring the TEC of the HTFC component materials interfaced (the electrolyte, electrode, and current passage) with that of the electric insulator. The final step in the manufacturing technology of an HTFC cell is the step of applying the electrically insulating layer. After which, the cell is ready to be placed into a stack, i.e., it does not seem possible to exceed the temperatures of forming the previous HTFC layers (components). At the same time, the caking temperatures of the electrical insulator materials are relatively high. The application of additives for obtaining fusible eutectics is unacceptable in this situation because of the ease at which they diffuse into the HTFC components which are interfaced with the electrical insulator, thereby disrupting their functional characteristics.

The method disclosed in (DE Patent No 2756172 Int. Cl. 6, C25B 9/04, published in 1979) for manufacturing an electrically insulating layer, comprising the steps of preparing the component compound on the basis of a magnesium spinel using fusible eutectics, is the most similar to the present group of inventions with respect to preparing the electrically insulating layer in its technical essence and the result achieved in service.

A typical sequence of arranging and manufacturing the HTFC components may include the following:

a porous carrier cathode;

a layer of electrode material of no more than 0.6 μm in thickness, contributing the activation of electrode processes, applied to the porous substrate of the carrier electrode material;

a current passage;

a gas-dense layer of the $Ce(Sm/Gd)O_{2-x}$, of 5 to 10 μm in thickness on the surface of the active electrode material contacting the MLS, wherein said layer is working as an electrolyte;

gas-dense layer of the YSZ on the surface of the $Ce(Sm/Gd)O_{2-x}$ of 3 to 5 μm in thickness for preventing the restoration of the doped cerium oxide (the electrolyte) by the fuel gases;

a fuel electrode cermet; and an electrical insulating layer.

SUMMARY OF THE INVENTION

The present group of inventions, address the problem of creating a universal method for manufacturing an HTFC and its components, by allowing for the manufacture of a cathode, an electrolyte, an anode, a current passage, electrically insulating and interface layers in multiple variations within the framework of a single technological process, while decreasing the specific power expenses and the range of reagents and equipment used for manufacturing.

In regard to the method for manufacturing a single HTFC to obtain the above-mentioned technical results, the set problem is solved by the fact that in the known method for manufacturing the HTFC including steps of manufacturing the cathode, and applying the electrolyte and anode together with a subsequent thermal treatment of the whole HTFC construction, the step of manufacturing the cathode is followed by applying an interface layer, a current passage, an electrolyte based on the doped cerium oxide, and an electrolyte based on the doped zirconium oxide, and subsequently followed by the step of applying the anode and the electrically insulating layer.

In order to manufacture the applied, interfaced and caked components in the high-temperature fuel cell a main metal-organic complex is prepared which is characterized by the general formula:

$$[CH_3-(CH_2)_n-C(CH_3)_2-CO_2]_m Me^{+m}$$

where the value of n is from 1 to 7 and an additional complex in specifically noted cases:

$$[C^n H_{2n+1}O]_m Me^{+m}$$

where the value of n is from 2 to 8 and m is the valence of the metal,

Where Me are chemical elements from the group including: Mg, Ca, Sr, Ba, Al, Sc, Y, In, La and the lanthanides Ti, Zr, Hf, Gr, Mn, Fe, Co, Ni, Cu, included in the form of a metal, or their oxides into the materials used for forming the cathode, the anode, the current passages, the electrolytes, the interface and electrical insulating layers.

In addition, when shutting off the cathode mass being formed while the manufacturing the cathode, metal-organic complexes having similar metal components are used as binding materials.

During the process of manufacturing the current passage, the electrolyte, the interface layer, and the electrical insulating layer, the metal-organic complexes with similar metal components are used either in the liquid phase for dispersions, as carriers of thin-dispersed powder materials of the current passages and electrolytes, for interface and electrical insulating layers, or used directly in the liquid phase form, i.e. without adding powder phase materials. The choice depends on the chemical characteristics of one or other material being applied.

During the process of manufacturing the anode, the cermet of the anode is manufactured using a liquid phase of the metal-organic complex in a mixture-paste which includes a thin, rough dispersion of the ion-conductive and electron-conductive powder materials.

The essence of the invention consists of utilizing, and forming the HTFC elements, metal carboxylates (and their mixtures), alcoholates of the same metals (and their mixtures), and the compounds of metal carboxylates with alcoholates in which thermal decomposition (in air oxygen) or thermal dissociation (in an inert medium) in which, without a decomposition of organic radicals transforming to the gaseous state, a synthesis of certain oxide materials having necessary phase and chemical composition occurs. The synthesis occurs at relatively low temperatures (300° to 600° C.), i.e. within the decomposition temperatures range for carboxylates and alcoholates, and, according to data confirmed by X-ray diffraction analysis, this synthesis leads to the production of the materials having a necessary crystalline structure.

At the time of the synthesis, the oxide materials have a high chemical activity, which, during the formation of the HTFC elements, determines their low-temperature caking point.

A choice of the carboxylates and alcoholates is performed on the basis of their start and finish decomposition temperature range, which must optimally coincide with the synthesis temperature range of the oxide material being applied. The decomposition (or for acylates, dissociation) process, preferably, should not possess any sharp endothermic or exothermic effects. In this case, either the separate carbonic acids and their mixtures, the alcoholates and their mixtures, or the compounds of alcoholates with carboxylates can be used.

FIG. 4 demonstrates the curves of the derivatographic analysis of the high temperature dissociation of the dimethyl-butyl-acetic acid zirconium salt, zirconium acetylacetonate and zirconium butylate in the nitrogen medium. It follows from the presented DTG diagram that a weight loss occurs at temperatures above 700° C. during the decomposition of the zirconium acetylacetonate. The decomposition of the dimethyl-butyl-acetic zirconium salt finishes at 530° C., and the decomposition of the zirconium butilate finishes at 380° C.

It also follows from the DTG in FIG. 4 that the zirconium butylate has the lower decomposition temperature (less than 400° C.) among the shown chemical compounds. Having a higher zirconium content, thereby facilitating a faster rate of application for the $ZrO_2/Y_2O_3$ film.

Also, the following compounds of zirconium butylate and the zirconium acetates were tested:

| | | |
|---|---|---|
| $Zr(OBu)(OCOR)_3$ | $1_{Bu}:3_{Ac}$ | $(3^1)$ |
| $Zr(OBu)(OCOR)_2$ | $2_{Bu}:2_{Ac}$ | $(3^2)$ |
| $Zr(OBu)(OCOR)$ | $3_{Bu}:1_{Ac}$ | $(3^3)$ |

In the compound $(3^1)$ there are few butoxy groups; therefore, the zirconium content increases insignificantly. The compounds $(3^2)$ and $(3^1)$ have increased zirconium content. In all three above-mentioned compounds containing zirconium butylate, an acceptable type of high-temperature joint decomposition (or for acylates dissociation) of the groups would be:

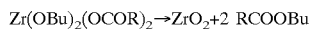

FIG. 5 shows decomposition thermograms for compounds of dimethyl-butyl-acetic zirconium with zirconium butylate, in comparison with pure zirconium butylate and pure dimethyl-butyl-acetic zirconium.

All thermograms were obtained in a nitrogen atmosphere. Comparing the obtained thermograms, the zirconium butylate compounds with the extract of zirconium dimethyl-butyl-acetic acid are decomposed at various temperatures: $530_4$; $470_{2:2}$; $435_{3:1}$; $380_{Bu}$° C. However, for the compounds of $(3^2$ and $3^3)$ content, the DTG curves $(2; 3)$ are more linear than that of the separate zirconium butylate or separate zirconium dimethyl-butyl-acetate. This means that in the absence of sharp endothermic or exothermic effects, this technological process is more stable for compounds of $(3^2$ and $3^3)$ content, i.e. a substrate temperature determined by the technology is not influenced by fluctuations due to endothermic and exothermic effects which, in turn, facilitates the quality of the gas-dense solid electrolyte applied onto the substrate.

In order to manufacture a thin-film electrolyte, compound mixtures of the following types are prepared from the initial carboxylates mixtures:

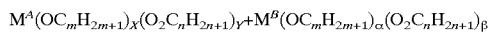

where $M^A$ is a metal with the A valence;
and where $M^B$ is a metal with the B valence;
m ranges from 2 to 6;
n ranges from 6 to 12;
x+y=A; and
α+β=B.

Further, the prepared compound mixture is applied onto the heated substrate by painting, spraying, rolling, or another method in an inert atmosphere of, for example, $N_2$, Ar, or $CO_2$, or alternatively in an air atmosphere. The substrate heating temperature and the atmosphere in which the application is performed depend on certain particular metal elements in the initial mixture composition.

In regard to the cathode, the present group of inventions addresses the difficulties which arise while developing a method for manufacturing the porous ceramic cathode carrier of the HTFC. This method will allow one to vary the strength and structural characteristics of the porous cathode over a wide range while decreasing the power expenses incurred from material caking.

In regard to the method for manufacturing a cathode with achieving the above-mentioned technical result, the set problem is solved by the fact that in the method for manufacturing the carrier cathode of the HTFC comprising steps of:

synthesizing a powder of an electrode material, the doped lanthanum manganite;

preparing a formable mass with an organic binding component; and forming a carrier basis, wherein the electrode material powder is usually obtained by co-precipitating the base carbonates and carbonates from their nitrate solutions, and its subsequent caking;

the carboxylates of chemical elements: Mn, La or Co, La, or Ni, La, or Cr, La, doped by elements from the alkaline-earth group, are used as organic binding components, and the step of forming the cathode is performed by isostatic compacting with subsequent caking at temperatures ranging from 1100° to 1380° C. For the electrode material powder, a compound characterized by the formula $La_xA_{1-x}MnO_3$ where A is Mg, Ca, Sr, Ba, or their mixture, and $0.6 \leq x \leq 1$ is used. In order to prepare the organic binding component, the basis of metal carboxylates, the acids are used with the common formula $C_nH_{2n}O_2$, where n ranges from 6 to 12. A total mass of the binding component constitutes 3–15 mass % relative to the formable mass being prepared. An overall concentration of metals in the mixture of carboxylates is within the range of 10 to 360 g per kg.

After decomposing, the binder forms a compound with the composition $La_ySr_{1-y}CoO_3$, $La_ySr_{1-y}CrO_3$, or $La_ySr_{1-y}NiO$, where $0.6 \leq y \leq 1.0$. The caking of the cathodes is performed in a furnace in the vertical position at a temperature range of 1100° to 1380° C.

The essence of the invention consists in utilizing, when forming the cathode from the initial powder, a binder which, under caking, forms a material identical to the material of the initial cathode powder during thermal decomposition. As a result, the caking of the product begins at the binder burn-out temperatures, from 300° to 600° C., due to the oxidation of metal components constituting the carboxylates, and simultaneous synthesizing from them a cathode material in the interparticle spaces of the initial powder of strontium manganite lanthanum.

During the process of manufacturing the formable mass, the carboxylates function both as plasticizer and binder, and also as pore agents in caking, due to the organic component burning out.

Thus, the present method for manufacturing the cathode includes the step of: utilizing the metal carboxylates as a binder when forming the cathode, thereby forming, during the burn out and caking process for the binder and cathode, a material highly responsive to caking and similar to the cathode material which simultaneously will, at temperatures lower than those for synthesizing the initial powder of the strontium manganite lanthanum, perform the processes of driving out the binder and caking. The utilization of the carboxylates described above as a binder, plasticizer, and pore agent reduces the shrinkage ratio during the process of caking from 18–20% to 0.5–3%. In this case, the choice of carbonic acids is performed based on the possibility to obtain the carboxylates with high metal content.

The present group of inventions relate, additionally, to the problem of manufacturing the HTFC in regard to the interface layer. Within the HTFC under working temperature conditions, chemical interactions between the interfaced components are minimized, thus the material stability in a working gas media, and the service life of the HTFC are increased. Depending on the functional design, the interface layer materials may comprise both electrode features and electrolyte features. In so doing, every interface layer carries a plurality of functions of the electrode and the interface layer activating the electrode reaction; the electrolyte and the anti-diffusion interface layer; the electrolyte, the protective covering of the previous layer (for example, from the restorative medium of the fuel gas) and the transition buffer combining the TEC of adjacent layers, etc. Since the required layer thickness does not exceed units of $\mu$m, then the most rational way for forming these layers is a method of pyrolysis-decomposing the chemical compounds of organic reagents. For this reaction, the metals are selected from the group consisting of one or other of the interface layers that posses radicals which are easily dissociated thermally and without a noticeable decomposition under interface-layer application conditions, the organic reagents are selected from the group of dimethyl-carbonic acids, and/or the organic reagents are selected from the group of alkyls complementing the dimethyl-carbonic acids in order to prevent sharp exo- and endothermal effects under similar interface-layer application conditions.

To achieve the above mentioned technical results, with regard to the method for manufacturing the interface layers, the invention solves the set problem by employing a mixture of compounds of necessary metals with organic reagents as an applied material in the method for manufacturing the interface layer comprising steps of: synthesizing a metal-organic complex; and applying it onto a heated substrate. Every compound of metal with organic reagent in this reaction is characterized by the formula:

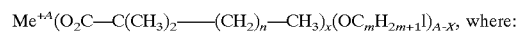

$Me^{+A}(O_2C-C(CH_3)_2---(CH_2)_n-CH_3)_x(OC_mH_{2m+1})_{A-X}$, where:

Me are metals selected from the series: Cr, Mn, Co, Ni, Cu, Y, Zr, La and lanthanides, Mg, Ca, Sr, Ba;

A is the valence of the given chemical element (metal);

X is a coefficient determined from the following inequality: $0<X<A$;

n ranges from 1 to 7; and m ranges from 2 to 8;

In order to produce a gas-dense film of the interface layer, the invention solves the set problem also by employing a mixture of compounds described by the common formula:

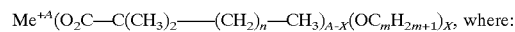

$Me^{+A}(O_2C-C(CH_3)_2---(CH_2)_n-CH_3)_{A-X}(OC_mH_{2m+1})_X$, where:

X is equal to 0;

Me are metals selected from the group: Mg, Ca, Sr, Ba, Ce, Pr, Sm, Gd, and Er. The total content of metals in the mixture of compounds being not higher than 20 g per kg, and the application step of is performed onto a substrate heated to a temperature not higher than 530° C. in an air atmosphere. Thus forming the gas-dense film of the interface layer no greater than 0.6 $\mu$m in thickness on the basis of doped lanthanum chromite activating the electrode reaction. Additionally, in order to manufacture the gas-dense film of the anti-diffusive interface layer, a mixture of compounds is used described by the common formula:

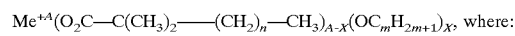

$Me^{+A}(O_2C-C(CH_3)_2---(CH_2)_n-CH_3)_{A-X}(OC_mH_{2m+1})_X$, where:

X is equal to 0;

Me are metals selected from the group: Ce and doping elements Sm, and Gd;

n is equal to 1 or 2; the total content of metals in the mixture of compounds being not higher than 20 g per kg; and the step of applying the mixture is performed onto a substrate heated to a temperature not higher than 380° C., in an inert gas atmosphere forming a gas-dense anti-diffusive film on the interface layer of not greater than 10 $\mu$m in thickness on the base of doped cerium oxide. Additionally, in order to manufacture the interface layer to protect the previous layer from the restorative gas medium, a mixture of compounds is used described by the common formula:

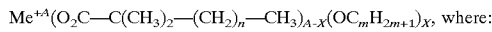
$Me^{+A}(O_2C-C(CH_3)_2-(CH_2)_n-CH_3)_{A-X}(OC_mH_{2m+1})_X$, where:

Me are metals selected from the group: Zr, Y, La and lanthanides;

A is a valence of the given chemical element (metal);

X may take the values 1, 2, 3, . . . A;

the total content of the zirconium and doping elements in the mixture being not higher than 50 g per kg; and the step of applying the mixture is performed by painting the mixture onto a substrate heated to a temperature not higher than 430° C. in an inert gas atmosphere of Ar, $N_2$, or $CO_2$, forming a protective interface layer of not greater than 5 μm in thickness on the basis of the doped zirconium dioxide.

The present invention relates to an improved method of manufacturing a current passage which not only produces a current passage free from the previously mentioned disadvantages, but also provides current passages with improved strength, structural, and electrical characteristics which may vary over a wide range. Additionally, the proposed method of manufacturing the current Passage, utilizes the initial components and materials similar to those used for manufacturing other HTFC components, providing support within the framework of uniform equipment and production processes.

This allows significant reductions in the range of used materials, reagents, machining attachments and, as a result, a decrease in the power expenses for manufacturing.

This method for manufacturing the current passage and obtaining the above-mentioned technical results, is dictated by the fact that in order to manufacture the HTFC current passage, a pyrolysis decomposition of metal-organic complexes of corresponding elements used in the composition of the current passage is employed. For this purpose a metal-organic complex of chrome, lanthanum and doping elements and a mixture of the carboxylates of these elements is synthesized and is characterized by the formula:

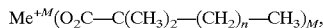
$Me^{+M}(O_2C-C(CH_3)_2-(CH_2)_n-CH_3)_M$, where Me is Cr, La, Sr, or Mg;

M is the metal valence;

n ranges from 1 to 7.

The concentration of Cr, La, Sr, Mg in the mixture of carboxylates is within the range of 20 to 110 g per kg.

The current passage is applied onto the prepared carrier air-electrode from the MLS by painting, rolling or spraying. In so doing, the electrode surface is heated up to a temperature sufficient for decomposing the mixture of Cr, La carboxylates and doping elements, and for forming a material corresponding to the $La_{1-x}Me_xCrO_3$ compound, where Me is the doping element.

In order to increase the rate of forming the current passage, an ultra-disperse mixture, based on a powder of doped lanthanum chromite and a mixture of liquid carboxylates of the same elements, is used as the material to be applied. In so doing, the growth rate of the current passage gas-dense film constitutes no less than 60 μm per hour on the surface of the carrier porous cathode, an increase of two or three times that of the previous. The ultra-disperse mixture is prepared by grinding the powder of doped lanthanum chromite into the homogenous state in a liquid medium of carboxylates of the chrome, lanthanum and doping additives.

The present group of the inventions, relates to the problem of creating a universal method for manufacturing the solid oxide electrolyte. This method would allow the strength and structural characteristics of the electrolyte to vary over a wide range while decreasing the power expenses for caking the material. Moreover, the method according to the present invention allows to manufacture the solid oxide electrolyte within the framework of the unique technology of manufacturing a single HTFC. This method significantly simplifies the machining attachments for the equipment, and also reduces the range of materials and reagents used during manufacturing the solid oxide electrolyte.

In the method for manufacturing the solid oxide electrolyte of the HTFC, consisting in a preparation of an initial metal-organic compound and comprising steps of: preparing water solutions of chemical element salts; extracting the individual chemical elements from their water solutions by organic reagents or their mixture; mixing the prepared individual extracts of metals; dehydrating the extract salts with forming the formable mass; heating the ceramic electrode up to the predetermined temperature; applying the prepared metal-organic compound onto the electrode surface; and making the subsequent thermal treatment of tile ceramic electrode with the applied metal-organic compound; the metal-organic compound for manufacturing the solid oxide electrolyte is synthesized using the reaction:

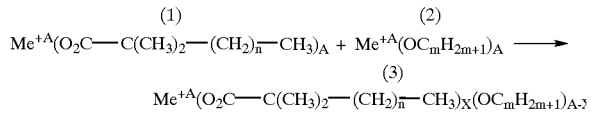

$$\underset{(1)}{Me^{+A}(O_2C-C(CH_3)_2-(CH_2)_{\overline{n}}-CH_3)_A} + \underset{(2)}{Me^{+A}(OC_mH_{2m+1})_A} \longrightarrow$$
$$\underset{(3)}{Me^{+A}(O_2C-C(CH_3)_2-(CH_2)_{\overline{n}}-CH_3)_X(OC_mH_{2m+1})_{A-X}}$$

with forming a mixture of carboxylates of metals, or a mixture of alcoholates of metals, or a mixture of carboxylates, and alcoholates of metals, where Me is any metal included into the functional component of the HTFC, A is the valence of this chemical element (metal);

X is a coefficient determined from the inequality 0<X<A;

n ranges from 1 to 7; and m ranges from 2 to 8.

In order to create the metal-organic compound (3), the synthesis of carboxylates of metals (1) is performed by a liquid and/or solid phase extraction of the corresponding metals ($Me^{+A}$) from the water solutions of their salts and/or suspensions of their carbonates, or hydroxides deposited from solutions of mineral acid salts. The synthesis of, for example, zirconium alcoholate (2) $Zr(OC_mH_{2m+1})_4$ is performed during the process of interacting mineral zirconium salt with alcohol and metallic calcium while boiling the mixture in a flask with a back-cooler until calcium dissolution.

The metal-organic zirconium compound (3), or (2), or (1), prepared according to the method described above and modified, at least, by one of the elements Mg, Ca, Sc, Y, Ce and/or lanthanides, is applied onto the carrier cathode surface by rolling, painting, spraying a gas-liquid emulsion, or scanning. Scanning being the method of applying the prepared composition with a heated electrode onto the cathode surface at a temperature of no more than 550° C. In so doing, the rate of the layer thickness growth is from 10 to 40 μm per hour.

In order to increase the growth rate of the applied electrolyte layer, a powder of modified zirconium dioxide with a particle size less than 1 μm and in the amount of 0.1 to 2.0 mass % is added into the prepared metal-organic compound composition to be applied, before the application step.

The process of applying the metal-organic compound onto the heated surface of the ceramic electrode is performed in an inert medium.

In order to manufacture a proton electrolyte, a mixture of carboxylates of metals is prepared characterized by the formula:

$$BaCe_{0.85}Gd_{0.15}[O_2C\text{---}C(CH_3)_2\text{---}(CH_2)_n\text{---}CH_3]_6$$

where n ranges from 2 to 3; and the mixture is applied onto the electrode surface, previously heated up to the temperature no higher than 470° C., is decomposed under the temperature forming the proton electrolyte having the $BaCeO_{0.85}Gd_{0.15}O_3$ composition.

The process of manufacturing the solid oxide electrolyte is finished after the application of the prepared metal-organic compound onto the heated electrode surface, and the obtained half-element is subjected to thermal treatment for an hour at temperatures of 900° to 1250° C.

The present group of the inventions relates to a method for manufacturing the cermet fuel electrode, and to providing technology for manufacturing the fuel electrode with predetermined porosity. Moreover, the technology of its manufacturing and the equipment used for that must be compatible with the technology and equipment used for manufacturing the single HTFC as a whole.

In the known method for manufacturing the cermet fuel electrode of the HTFC, comprising steps of:

forming, on the solid electrolyte being in contact with the internal air electrode, a cermet electrode layer consisting of the rough-disperse electron-conductive material chosen from the group of the metallic nickel and/or cobalt, rough-disperse ion-conductive material based on the doped zirconium dioxide and/or doped cerium oxide;

and subsequent forming, on the rough-disperse layer, a separate thin-disperse electron-conductive porous multi-phased layer consisting of a metallic material chosen from the group of the nickel and/or cobalt, and an ion-conductive doped material based on the cerium oxide, by means of applying and subsequent heating the mixture-paste consisting of the mentioned thin-disperse components and binder;

wherein the cermet fuel electrode is manufactured by simultaneous forming the rough-disperse and thin-disperse components of the porous multi-phased layer by applying the mixture paste onto the electrolyte being in contact with the internal air electrode.

and with regard to the method for manufacturing the cermet fuel electrode with achieving the above-mentioned technical result, the present invention holds that the mixture-paste is prepared by mixing the powders of rough-disperse electron-conductive material chosen from the group of the metallic nickel and/or cobalt, rough-disperse ion-conductive material, further chosen on the basis of doped zirconium dioxide and/or doped cerium oxide. Additionally, the thin-disperse ion-conductive material is chosen on the basis of the doped cerium oxide, and the liquid phase of the nickel and/or cobalt carboxylates, is characterized by the common formula:

$$Me^{+m}(O_2C\text{---}C(CH_3)_2\text{---}(CH_2)_n\text{---}CH_3)_m$$

where Me is the Ni and/or Co,
m is the metal valence,
n ranges from 1 to 7, which, during the process of the thermal treatment, forms the electron-conductive porous multi-phased layer, securing together the rough-disperse and thin-disperse phases forming the cermet of the fuel electrode.

Moreover, the solid to liquid phase ratio in the prepared paste is within the range of 1/3 to 5/7 mass.

The concentration of the nickel and/or cobalt in liquid carboxylates must be within the range of 20 to 70 g per kg for carboxylates, and the powder of the nickel and/or cobalt is added in a 1.1/1.0 ratio: the amount of the metal powder to electrolyte powder.

Rough-disperse particles of the nickel and/or cobalt powder must have a regular spherical structure of 10 to 15 μm in diameter, and the synthesized rough-disperse powder of the electrolyte must have a thread-like form, the ratio of the particle length to particle diameter being equal, at least, to 10 when the particle diameter is of 5 to 10 μm. In so doing, the thin-disperse powder of doped cerium oxide contains, in its composition, 90% of particles having diameter less than 1.0 μm. The step of applying the mixture-paste is performed by painting in an air medium at room temperature and under atmospheric pressure. The half-element with the applied raw mixture-paste is subjected to a thermal treatment in vacuum at temperatures no higher than 400° C. and residual pressure no greater than 0.1 atmosphere.

With regard to the aspect of the electrical insulating layer, the present group of inventions addresses a method of manufacture an HFTC in which the maximum effective electrical insulation between its components, i.e. the current passage and the anode, the electrolyte and the fuel gas medium, is provided to prevent parasite current couplings between electrodes.

In regard to the method for manufacturing the electrical insulating layer and achieving the above-mentioned technical result, in the method for manufacturing the electrical insulating layer, comprising a step of preparing the component mixture on the basis of magnesium spinel, a chemical compound of necessary metals having an organic reagent is chosen as the second component in the prepared mixture to be applied. Every separate compound of the metal having an organic reagent being characterized by the formula:

$$Me^{+A}[(O_2C\text{---}C(CH_3)_2\text{---}(CH_{y2})_n\text{---}CH_3)_{1-X}(OC_mH_{2m+1})_X]A,$$

where n ranges from 1 to 7,
m ranges from 6 to 12,
Me is the Mg, Al, Zr, Y, Ca, La and lanthanides,
A is the metal valence,
x may take values from 0 to 1 depending on the method of application; for example, painting or spraying from the gas-drop emulsion.

In order to manufacture the electrical insulating layer by the painting method, a dispersion consisting of powder material to the extent of 30% and of liquid phase material to the extent of 70% is used. The magnesium spinel having a composition of $MgAl_2O_4$ with a 15% addition of the 9YSZ powder as a powder material, and a mixture of Al and Mg carboxylates where the organic part of the carboxylates is presented by the dimethyl-butyl-acetic acid is used as a liquid phase. The weight ratio between the aluminum and magnesium in the carboxylate mixture is designed to create a compound corresponding to the magnesium spinel $MgAl_2O_4$ during their calcination. The temperature of a surface to be electrically insulated is maintained at a level no higher than 530° C. during the application step.

The method for manufacturing the electrical insulating layer using the gas-drop emulsion application method is realized in the following manner. The metal-organic Al and Mg salt of the $Mg[Al(Alc)_4]_2$ composition are mixed with the Zr and Y carboxylates where the organic part is presented by the dimethyl-butyl-acetic acid. Zirconium and yttrium carboxylates are added in a sufficient amount for creating the yttrium-stabilized zirconium in amount of 5 to 15% in the composition of the magnesium spinel, after pyrolysing the mixture on the heated surface to be electrically insulated. The application step is carried in the form of a strip ranging from 2 to 3 mm in width. The temperature of the surface to be electrically insulated is maintained at 450° C. during the application step. As a result, an electrical insulating layer of 12 to 15 μm in thickness is formed, having a composition corresponding to the chemical formula $(MgAl_2O_4)_{1-n}((ZrO_9)_{0.91}(Y_2O_3)_{0.09})_n$, where n ranges from 5 to 15 mass %.

BRIEF DESCRIPTION OF THE DRAWINGS

The group of inventions is explained by examples of embodiments with references to the following attached drawings.

DETAILED DESCRIPTION OF THE PREFERRED EMBODIMENT

Figure 1:
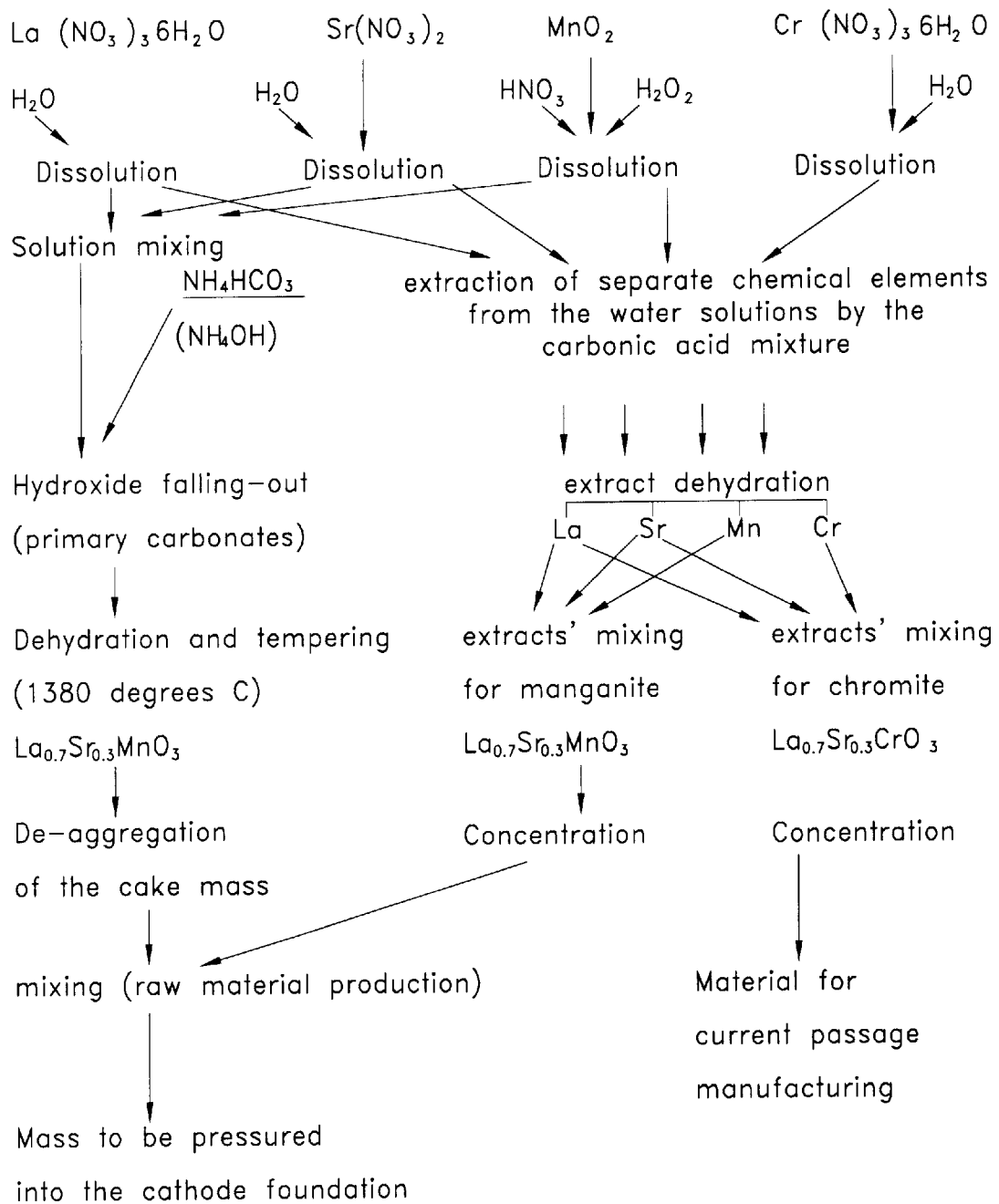
FIG. 1 shows the main stages and the sequence of manufacturing the MLS and the material for applying a current passage.
Figure 2:
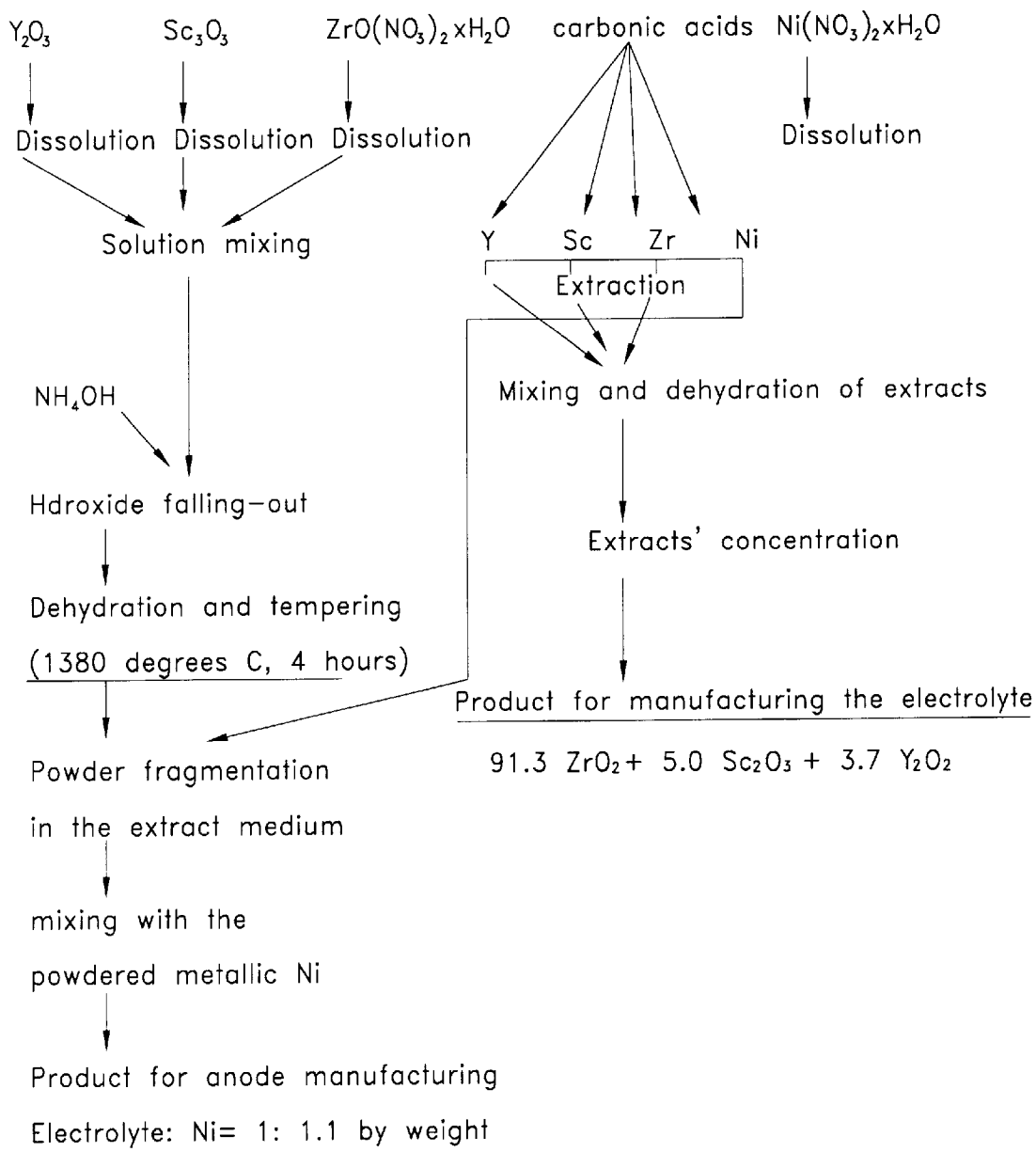
FIG. 2 shows the main stages and the sequence of manufacturing the materials for applying the electrolyte and the cermet anode.
Figure 3:
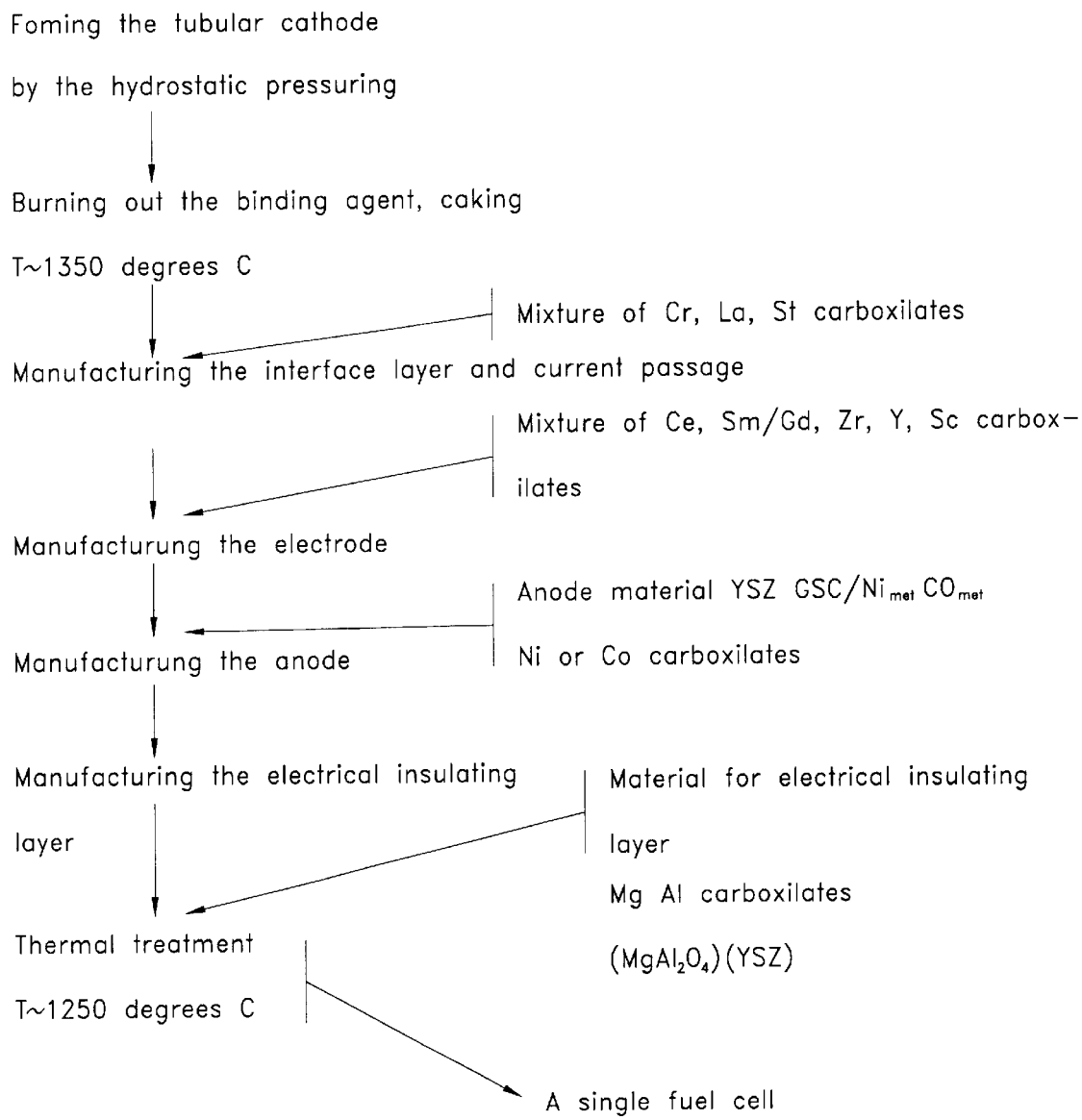
FIG. 3 shows the main stages of manufacturing the HTFC.
Figure 4:
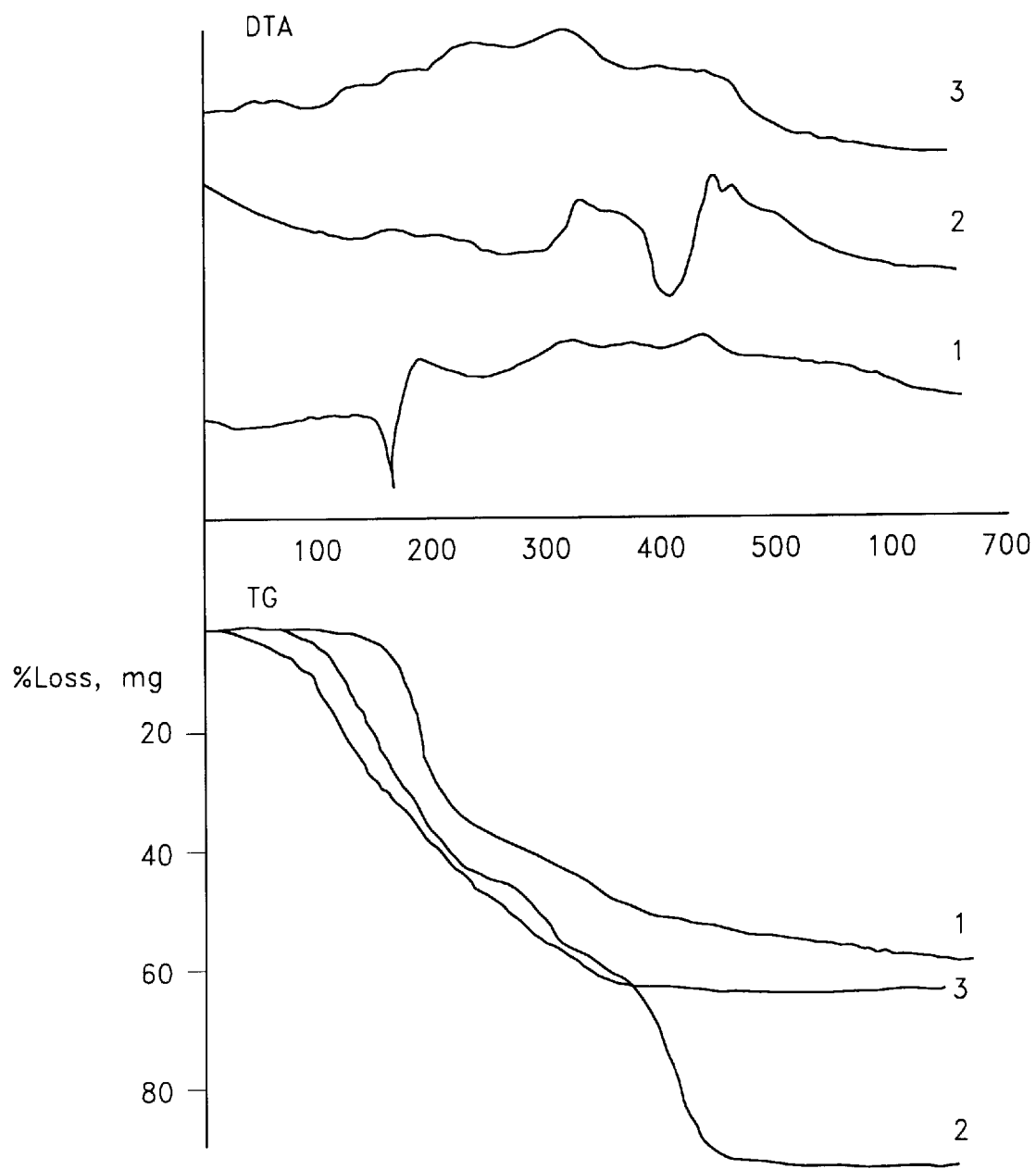
FIG. 4 shows the thermoanalytical curves for the zirconium acetylacetonate (1), zirconium dimethyl-butyl-acetate (2), and zirconium butylate (3)
Figure 5:
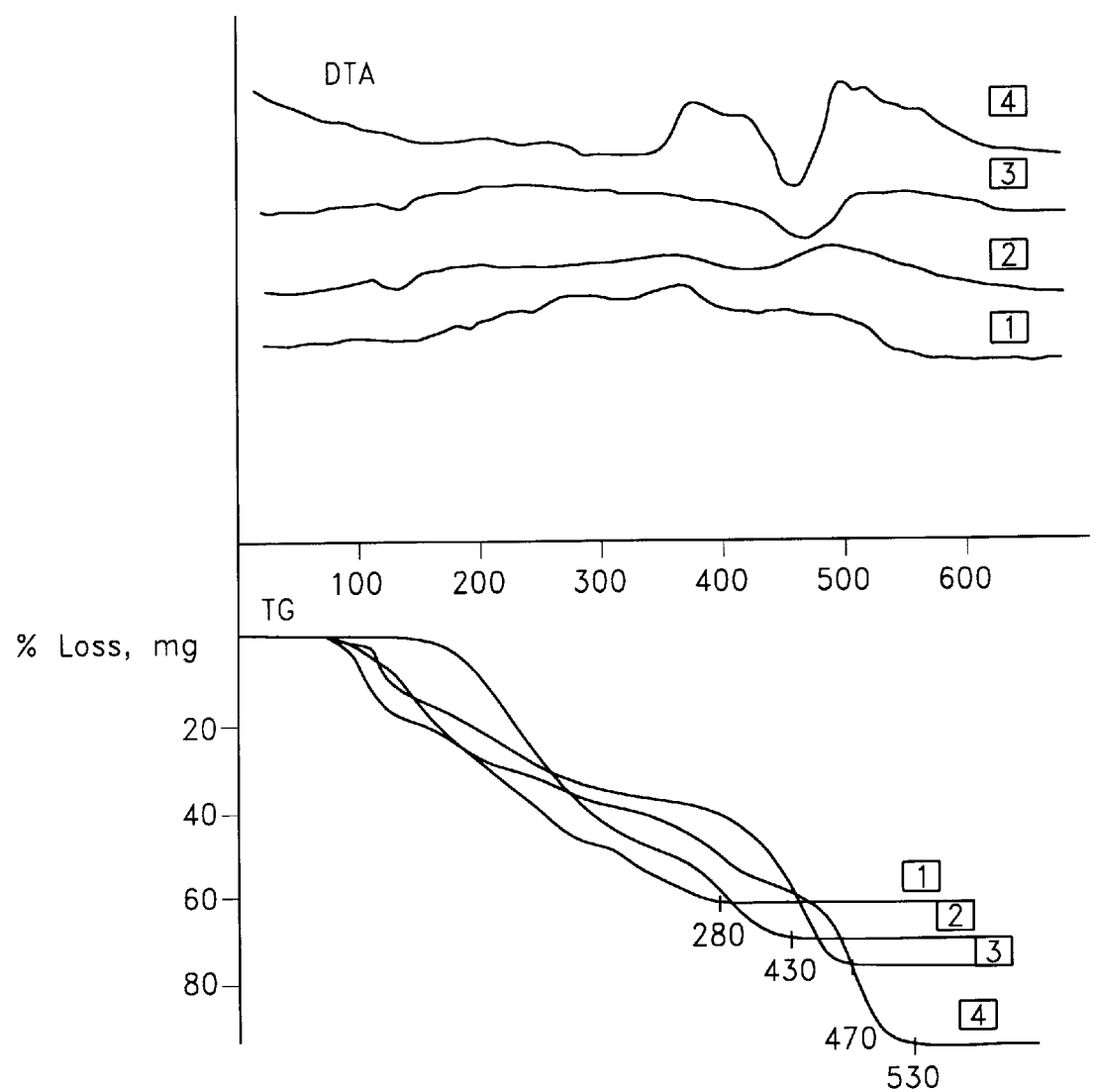
FIG. 5 shows the thermoanalytical curves for the $Zr(OBu)_4$ (1), $Zr(OBu)_3(2MeBuAc)_4$ (2), $Zr(OBu)_2(2MeBuAC)_2$ (3), $Zr(2MeBuAC)_4$ (4)

FIGS. 1, 2, and 3 show a principal technological sequence of processes for manufacturing the HTFC. As it was mentioned above, carboxylates of individual metals or mixtures of carboxylates of individual metals are taken as a universal material being a carrier of metals, which after thermal treatment, form the materials of the electrodes, interface layer, current passage, electrolyte, electrical insulating layer, diffusion barrier etc., the carboxylates' common formula being: $[CH_3-(CH_2)_n-C(CH_3)_2-COO]_mMe^{+m}$, where m is the metal valence.

Metal carboxylates are mixed in such a way that the concentration ratios of these metals in the mixtures correspond to pre-determined ones, i.e., to those necessary in the electrolytes, electrodes, electrical insulating and interface layers etc. to be formed.

Then, the prepared carboxylate mixtures are used in different variations, depending on the problem being particularly solved, for example, manufacturing the particular components of the HTFC.

When manufacturing the carrier electrodes, the carboxylates are used as a binder, plasticizer and pore-forming agent simultaneously. In so doing, in order to produce the binder, the carboxylate mixtures are concentrated up to the possibly maximum value for given carboxylates. Then, the powder is created on the basis of this binder, and an article (the carrier cathode, carrier anode, stack elements etc.) is formed by compacting from the press-powder.

To manufacture the carrier cathode from MLS, a powder of the $La_{0.7}Sr_{0.3}MnO_3$ composition is prepared. When producing the binder, a mixture of carbonic acids is taken: the dimethyl-propyl-acetic, dimethyl-butyl-acetic, dimethyl-amyl-acetic, dimethyl-hexyl-acetic, and dimethyl-lauryl-acetic acids.

Figure 6:
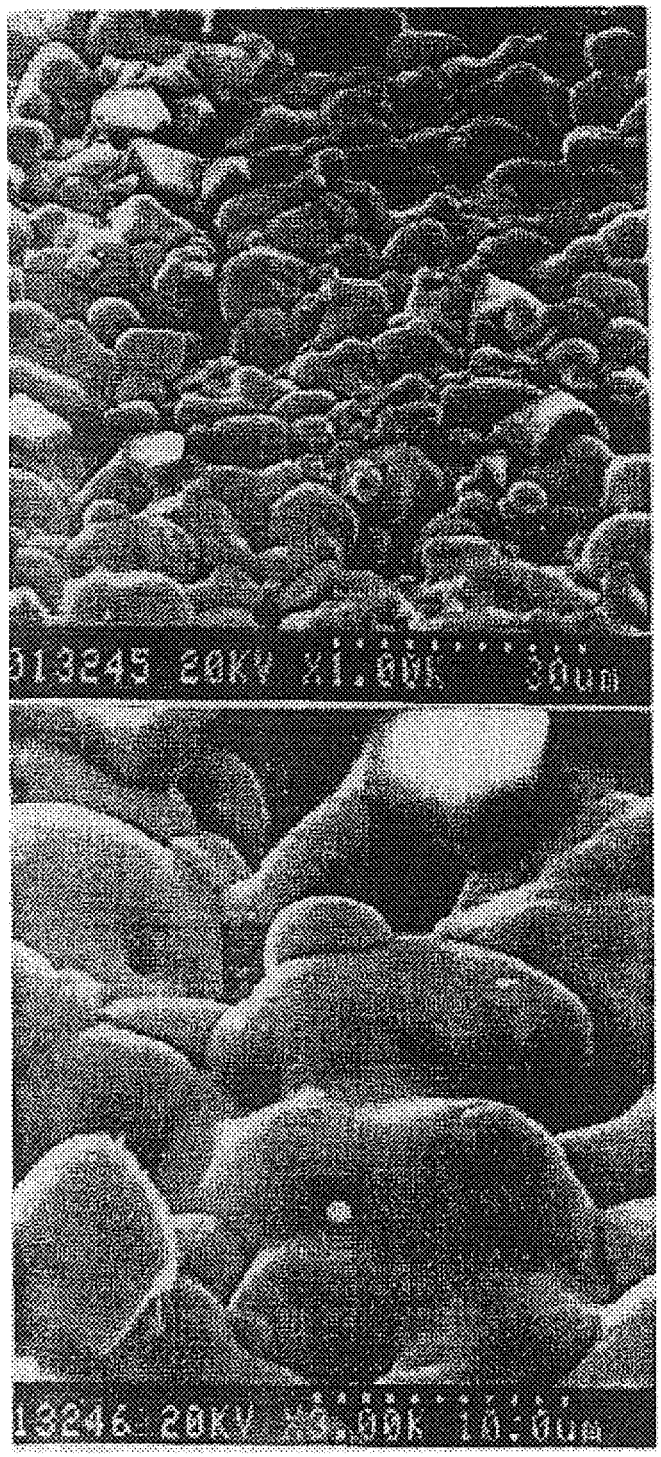
FIG. 6 shows the MLS cathode surface under various magnification degrees.

The carboxylates of individual metals: La, Mn, Sr are obtained by extraction of the mixture from these acids. After mixing, the carboxylate mixture is concentrated in vacuum at the necessary residual pressure and corresponding temperature, up to the maximum total concentration of metals in the mixture. The concentrated mixture is mixed with the $La_{0.7}Sr_{0.3}MnO_3$ powder in a screw mixer in the presence of terpene. Then the terpene is distilled off in vacuum. The cathodes are manufactured by the method of hydrostatic compacting and are caked in the air. Some results of caking at various temperatures are presented in the table 2. For further production of elements, the cathodes with open porosity of about 36.6% and pore diameter from 2 to 3 μm are selected (FIG. 6).

Then, the interface layer is applied onto the cathode surface, the interface layer being a gas-dense film of the following composition:

$La_{1-x}Me_xCrO_3$, where Me is the doping element selected from the series of Mg, Ca, Sr, and Ba. For this purpose, the carboxylates of individual metals are prepared, and then mixed corresponding to a proportion necessary to form the $La_{1-x}Me_xCrO_3$ composition during their pyrolysis, and subsequently applied onto the previously heated surface of the carrier cathode by painting, spraying the gas emulsion, or rolling. A total concentration of metals in the carboxylates (converting to oxides) is not higher than 30 g per kg. The layer being formed being no thicker than 0.6 μm, and during application, the temperature of the previously heated surface being no more than 530° C.

A strontium lanthanum chromite current passage is applied onto a prepared cathode having an interface layer. In order to manufacture the current passage, an ultra-disperse powder of $La_{0.7}Sr_{0.3}MnO_3$ is added to a mixture of the Cr, La and Sr carboxylates with a concentration not higher than 110 g per kg (by the sum of oxides formed during the calcination) and mixed actively. In so doing, the ratio between the powder solid phase and the carboxylates liquid phase is in the range of 1/100 to 5/100 parts by weight. The prepared ultra-disperse mixture is applied onto the surface of the carrier cathode, which has been previously heated to a temperature sufficient for forming a film of the doped lanthanum chromite from the metal-organic complex. Practically, the temperature of the film forming does not exceed 530° C. The step of applying the current passage onto the cathode surface may be performed by painting it in a nitrogen flow at atmospheric pressure, or by spraying the ultra-disperse suspension in an inert medium. The growth rate of the gas-dense film of the current passage on the surface of the carrier porous cathode should be no less than 20 to 60 μm per hour.

Subsequently, an electrolyte is applied onto the cathode having the interface layer and current passage. For this purpose the required metals' carboxylates, alcoholates, or their mixtures are used as raw organic materials. A choice of one or another composition or mixture (of carboxylates/ alcoholates) depends on chemical features of the metals in the mixture composition.

In order to manufacture a layer of electrolyte being a thin (from 5 to 10 μm) gas-dense film of the $(CeO_2)_{0.85}(Sm_2O_3)_{0.15}$ or $(CeO_2)_{0.8}(Gd_2O_3)_{0.15}$ composition, a mixture of Ce/Sm or Ce/Gd carboxylates is used; where an organic portion of the carboxylates is represented by the dimethyl-butyl-acetic acid with the main substance's content of 97%. A step of applying is performed at a temperature not higher than 380° C. by painting, rolling or spraying.

As it was mentioned above, in order to protect the electrolyte from restoration by anode gases reacting with the basis of doped cerium, a layer of electrolyte is produced on the basis of doped zirconium dioxide.

The dimethyl-butyl-acetic acid and the butanol are used as raw organic reagents for producing a material which allows the application of the thin-film oxide electrolyte onto the basis of the 9YSZ. The carboxylates of Zr and Y metals are produced by a liquid extraction technique, and the zirconium butylate is produced by the technique of interacting zirconium sulfate with butanol and metallic calcium. The yttrium is added to the prepared mixture in the form of the $Y(2MeBuAc)_3$ carboxylate. The electrolyte thickness ranges from 3 to 5 μm.

In order to manufacture the second electrode (anode) on the element, a mixture-paste is prepared on the basis of ion-conductive material (doped zirconium dioxide and/or doped cerium oxide), electron-conductive material (metallic powdered nickel and/or cobalt), and metal carboxylates (nickel and/or cobalt) is used. In order to produce Ni/Co carboxylates, a mixture of carbonic acids may be used having the common formula $HO_2C$—$C(CH_3)_2$—$(CH_2)_n$—$CH_3$, where n may vary from 1 to 8. The Ni/Co concentration in the carboxylates is no less than 70 g per kg (by the sum of metal oxides during calcination). In the mixture-paste content, the ratio of all solid components to liquid ones is within the range of 1/3 to 5/7 by mass. The step of applying the anode onto the heated surface is performed by painting. The surface temperature is no higher than 380° C.

The electrical insulating layer between the current passage and the anode, on the electrolyte surface, is manufactured as the last component in the HTFC. This is necessary due to the need to prevent parasitic current coupling between the electrodes thereby eliminating a <<(triple point (fuel gas/electrolyte/cathode) effect>>in locations of the current passage output.

In order to manufacture the electrical insulating layer, a dispersion comprising 30% of the powder material, and 70% of the liquid phase is used. The magnesium spinel of the $MgAl_2O_4$ composition with a 15% addition of the 9YSZ powder is used as the powder material, and a mixture of the carboxylates of the aluminum and Mg is used as the liquid phase material, where the organic component of the carboxylates is represented by the dimethyl-butyl-acetic acid. The weight ratio between the aluminum and magnesium in the mixture of the carboxylates during their calcination is designed to form a substance corresponding to the magnesium $MgAl_2O_4$ spinel. The dispersion is applied by painting onto the surface to be insulated, the surface being heated not higher than 530° C.

Thus, manufacturing all the HTFC components is performed in one location (FIG. 7) using a single physical/chemical process and a single class of organic reagents: the dimethyl-carbonic acids. The final stage in manufacturing the HTFC is the step of caking at a temperature not higher than 1280° C. for an hour.

Preferred Embodiment of the Invention for Manufacturing the Cathode

In the given example, manufacturing of the HTFC starts with the step of manufacturing the carrier ceramic cathode. For this purpose, an electrode material powder is synthesized by a joint precipitation of carbonates from their nitrate solutions and, subsequently, their caking. A formable mass is then prepared with an organic binding component containing Mn, La or Co, La or Cr, La or Ni, La, doped by elements of the alkaline-earth element group. Then, the cathode is formed from a press-mass by isostatic compacting, and is subjected to caking.

Thus prepared, the ceramic cathode is the carrier element of the whole HTFC construction.

The claimed method solves the problem of manufacturing the carrier ceramic cathode with predetermined structure and strength, having a significant decrease in thermal-treatment temperature, and with low values (from 0.5 to 3%) of shrinkage coefficients while caking.

The advantages achieved in carrying out the claimed method for manufacturing the cathode are realized by using a specially created material for manufacturing the cathode. The material in the formable mass functions as a plasticizer, a binder and a pore-forming agent simultaneously. As it was mentioned above, this allows an article with predetermined structural characteristics (not provided by the known technology), and with significantly low caking temperatures and shrinkage ratios to be obtained.

As a result, the proposed invention provides a shorter range of raw materials, a uniform technological approach for obtaining the required components with lower power consumption and higher output due to the fitness of production.

The method is realized as follows:

The powder of $La_xSr_{1-x}MnO_3$ composition, where $0.6 \leq X \leq 1.0$, is prepared, for example, by joint precipitation of La, Sr, Mn carbonates from their nitrate solutions with the subsequent filtration of the sediment, dehydration, thermal treatment providing a synthesis of a substance, and subsequent grinding.

At the same time a binder representing the mixture of La, Sr, Mn carboxylates is prepared, for example, by the liquid extraction method. A concentration of metals in the mixture ranges from 150 to 360 g per kg. After this, a formable mass is prepared by mixing the prepared electrode powder with the binder, where the binder is of 3 to 15% by mass. The prepared mass is then formed, and the obtained cathode blank of necessary shape is subjected to caking.

The cathode manufactured according to the present invention completely satisfies all technical features presented in particular examples which realize the present invention.

EXAMPLE 1

The powder of the $La_{0.7}Sr_{0.3}MnO_3$ composition was produced by the technique of joint precipitation of La, Sr, Mn carbonates from the nitrate solutions of these metals, filtration of the obtained sediment, dehydration and caking at the temperature of 1380° C. for an hour. The obtained rough cake was de-aggregated in a mill to obtain the predetermined grain size of the aggregates. X-ray phase analysis of the obtained powder has proven the formation of a single-phase product of the perovskite structure.

The carboxylates of individual metals were prepared by extracting the corresponding metal by the mixture of carbonic acids. In manufacturing the carboxylates, a commercially available mixture of carbonic acids was used for the binder, the mixture being of the following composition:

| | | |
|---|---|---|
| Dimethyl-propyl-acetic acid | $C_7H_{14}O_2$ | 36% by weight, |
| Dimethyl-butyl-acetic acid | $C_8H_{16}O_2$ | 31% by weight, |
| Dimethyl-amyl-acetic acid | $C_9H_{18}O_2$ | 15% by weight, |
| Dimethyl-hexyl-acetic acid | $C_{10}H_{20}O_2$ | 7% by weight, |
| Dimethyl-lauryl-acetic acid | $C_{12}H_{24}O_2$ | 2% by weight. |

Some concentrations of metals are presented in the Table 1.

TABLE 1

| Element | Mg | Al | Cr | Mn | Co | Ni | Sr | Y | Zr | La | Ce | Sm | Gd |
|---|---|---|---|---|---|---|---|---|---|---|---|---|---|
| Conc. g per kg | 23 | 34 | 47 | 50 | 56 | 58 | 74 | 75 | 100 | 110 | 25 | 150 | 160 |

The obtained individual extracts were mixed in a required proportion. In the given example, the mixture of La, Sr, Mn carboxylates corresponding to the $La_{0.7}Sr_{0.3}MnO_3$ composition and to the total metal concentration of 210 g per kg was used.

The $La_{0.7}Sr_{0.3}MnO_3$ powder was mixed with the solution of the carboxylates in the mass proportion 93:7. The indicated mixture was prepared in a screw mixer for one hour. The obtained mixture was used to obtain the air electrodes, having a tubular form, by a hydrostatic compacting technique. Then, the tubes were caked in air at various temperatures. The results are presented in Table 2.

TABLE 2

| No of sample | Caking T, ° C. | Caking time, hours | Porosity, % | Mean pore diameter, μm | Bending strength, kg per sq. cm |
|---|---|---|---|---|---|
| 1 | 1300 | 1 | 37.0 | 4.2 | 42.0 |
| 2 | 1350 | 1 | 32.3 | 2.0 | 63.7 |
| 3 | 1380 | 1 | 29.4 | 1.9 | 69.4 |
| 4 | 1420 | 1 | 27.6 | 1.7 | 70.2 |

EXAMPLE 2

A mixture of $La_{0.7}Sr_{0.3}MnO_3$ powder and the solution of La, Sr, Mn carboxylates were prepared as described in the Example 1. The obtained mixture was heated, in air, to a temperature of 650° C. for 45 minutes. The obtained powder was deaggregated, in order to destroy any unstable aggregates formed after thermal treatment. Further steps of manufacturing the tubular cathodes are similar to those indicated in the Example 1. The tube caking temperature was 1380° C. The results of changing the strength of the articles are presented in Table 3.

TABLE 3

| N° of preliminary treatment cycles | Porosity, % | Bending strength kg per sq. cm |
|---|---|---|
| 1 | 29.0 | 72.0 |
| 2 | 28.6 | 75.8 |
| 3 | 27.9 | 76.4 |
| 4 | 27.3 | 77.0 |
| 5 | 27.1 | 77.0 |

EXAMPLE 3

The powder of the $La_{0.7}Sr_{0.3}MnO_3$ composition used in examples 1 and 2 was mixed with a mixture of carboxylates containing Co, La, and Sr in proportions corresponding to the $La_{0.6}Sr_{0.4}CoO_3$ composition. The indicated carboxylates were obtained by extracting the corresponding metals. The total concentration of metals was 291 g per kg. The tube manufacture was performed as indicated in example 1. The results of caking the tubes at various temperatures are presented in Table 4.

TABLE 4

| No of sample | Caking Parameters | | Porosity % | Bending strength, kg per sq. cm |
|---|---|---|---|---|
| | T, ° C. | Time, Hour | | |
| 1 | 1200 | 1 | 39.0 | 55.0 |
| 2 | 1250 | 1 | 37.5 | 57.0 |
| 3 | 1300 | 1 | 32.2 | 70.0 |
| 4 | 1350 | 1 | 30.0 | 74.0 |

Preferred Embodiment of the Invention for Manufacturing the Interface Layer

EXAMPLE 4

In order to manufacture the interface layer, a CLS film of 0.3 to 0.6 μm in thickness is applied onto the carrier porous cathode from the MLS manufactured as described in the example 1. The step of applying is performed by painting the cathode surface, heated up to 530° C, with the mixture of Cr, La, Sr carboxylates in the air atmosphere. The total concentration of Cr, La, Sr in the mixture of the carboxylates (converting to oxides) was 30 g per kg. The organic component of the carboxylates is represented by the mixture of the following composition:

| | | |
|---|---|---|
| Dimethyl-propyl-acetic acid | $C_7H_{14}O_2$ | 36% by weight, |
| Dimethyl-butyl-acetic acid | $C_8H_{16}O_2$ | 31% by weight, |
| Dimethyl-amyl-acetic acid | $C_9H_{18}O_2$ | 15% by weight, |
| Dimethyl-hexyl-acetic acid | $C_{10}H_{20}O_2$ | 7% by weight, |
| Dimethyl-lauryl-acetic acid | $C_{12}H_{24}O_2$ | 2% by weight. |

The proportion of Cr, La, and Sr oxides after decomposing the mixture of carboxylates on the heated cathode surface, corresponds to the $La_{0.7}Sr_{0.3}MnO_3$ material. After several (from 30 to 50) painting cycles, the film thickness reaches from 0.5 to 0.7 μm.

EXAMPLE 5

Further, the temperature for heating the cathode having the applied CLS layer is decreased to 380° C., and a layer of the $(CeO_2)_{0.85}(Gd_2O_3)_{0.15}$ is applied onto the cathode surface in a nitrogen atmosphere from the mixture of Ce and Gd carboxylates, where the organic component of the carboxylates is represented by dimethyl-butyl-acetic acid of 97% by weight. The sum of concentrations of the Ce and Gd in the carboxylates' mixture (converting to oxides) is 55 g per kg. After several (from 80 to 100) painting cycles, a $(CeO_2)_{0.85}(Gd_2O_3)_{0.15}$ film of 5 to 10 μm in thickness is formed over the CLS film.

EXAMPLE 6

Further, the temperature for heating the cathode having applied CLS and $(CeO_2)_{0.85}(Gd_2O_3)_{0.15}$ layers is increased to 410° C., and the step of forming the 9YSZ layer is performed in a nitrogen atmosphere. The step of applying the 9YSZ layer is performed with the metal-organic $Zr(OBu)_2(2MeBuAc)_2$—$Y(2MeBuAc)_3$ compound mixture with a Zr and Y concentration (converting to the oxide sum) of 30 to 50 g per kg. After several (from 60 to 80) painting cycles, the 9YSZ layer of 3 to 5 μm in thickness is formed.

Preferable Embodiment of the Invention for Manufacturing the Current Passage The method is realized as follows: the carboxylates of individual metals are prepared, then the individual metal carboxylates are mixed according to the proportion necessary for forming the $La_{1-x}Me_xCrO_3$ composition during their pyrolysis, where Me is a doping element. After this, an ultra-disperse mixture from a synthesized separately-prepared powder of the electron-conductive material $La_{1-x}Me_xCrO_3$ and a mixture of the carboxylate is prepared with the ratio between the solid phase of the powder and the liquid phase of the carboxylates being within the range of 1/100 to 5/100. The prepared ultra-disperse mixture is applied onto the carrier cathode surface, which has been previously heated to a temperature sufficient to form a film of doped lanthanum chromite from the metal-organic complex. Practically, the temperature for forming the mentioned film does not exceed 530° C. The step of applying the current passage onto the carrier cathode surface may be performed by painting in a nitrogen flow at atmospheric pressure, or by spraying an ultra-disperse suspension in an inert medium. In so doing, the rate of growth of the current passage gas-dense film on the carrier cathode surface is from 20 to 60 μm per hour.

EXAMPLE 7

A mixture of Cr, La, Sr carboxylates is prepared similar to its preparation in example 1 using the same organic reagents. The initial compositions of individual components by metal content is presented in Table 1.

When calcinating the mixture, a strontium lanthanum chromite compound of the $La_{0.8}Sr_{0.3}MnO_3$ composition is formed. The mixture is applied onto the porous surface of the carrier cathode made in the form of a tube, the surface being heated to 530° C. in a nitrogen flow. A gas-dense track of the current passage, 3 min in width, is formed on the tube surface. The rate of growth of the current passage film is from 25 to 30 μm per hour.

EXAMPLE 8

Contrary to example 4, the $La_{0.8}Sr_{0.3}MnO_3$ powder, in which 90% of the particles have a diameter less than 1 micron, is added into the mixture of Cr, La, and Sr carboxylates. The amount of the added powder is 1% by mass to the mass of carboxylates. Then, the prepared mixture is applied onto the surface of a carrier cathode, as indicated in example 4; the increasing growth rate being 60 μm per hour.

Preferable Embodiment of the Invention for Manufacturing the Electrolyte

In order to manufacture the thin-film electrolyte from the initial mixtures of carboxylates (Zr/Y), a mixture of the following type is prepared:

$$M^A(OC_mH_{2m+1})_X(O_2C_nH_{2n+1})_Y+M^B(OC_mH_{2m+1})_\alpha(O_2C_nH_{2n+1})_\beta$$

where $M^A$ is a metal with the valence A,
$M^B$ is a metal with the valence B,
m ranges from 2 to 8,
n ranges from 6 to 12,
X+Y=A, and
α+β=B.

Figure 7:
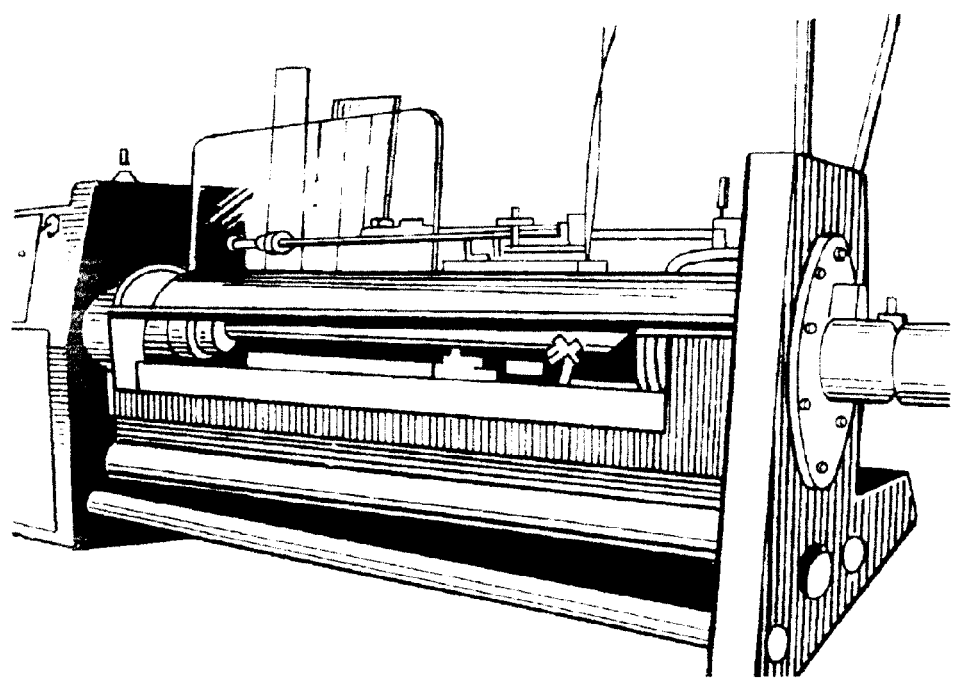
FIG. 7 shows a plant for applying the electrolyte onto the tubular electrode.

Further, the prepared mixture of compounds is applied onto the heated substrate by spraying, painting or other methods in an inert atmosphere ($N_2$, Ar, $CO_2$). The temperature for heating the substrate depends on particular elements of metals in the initial mixture composition. In the photo of FIG. 7, an apparatus for applying the thin oxide films by painting is shown at the moment of manufacturing the electrolyte.

EXAMPLE 9

The dimethyl-butyl-acetic acid and the butanol are used as raw organic reagents for manufacturing a material allowing to apply thin-film oxide electrolyte on the basis of the 10YSZ. The carboxylates of Zr and Y metals are produced by a liquid extracting technique, and the zirconium butylate is produced by a technique of interacting the zirconile sulfate with the butanol and calcium oxide. The metal concentrations are presented in Table The initial compound used for application is obtained through the reaction:

$$Zr(OBu)_4+Zr(2MeBuAc)_4 \rightarrow 2Zr(OBu)_2(2MeBuAc)_2$$

The yttrium is added to the manufactured mixture in the form of the. $Y(2MeBuAc)_3$ carboxylate. The mixture forms, when calcinating, a compound of the cubic structure which composition is shown in Table 5, row 1.

The thus produced material is applied onto the tube surface of the strontium lanthanum manganite cathode. The temperature of the tube surface is maintained at a level of 530° C. The reaction is performed in a nitrogen flow. As a result, a gas-dense film of the solid electrolyte of the $91ZrO_29Y_2O_3$ composition (molar % are indicated) is formed on the surface of strontium lanthanum manganite cathode. The film thickness depends on the number of passages of a carriage having a carboxylate dosing device. The rate of the thickness growth of the electrolyte film is about 25 μm per hour. After the step of applying the electrolyte, the tube is subjected to thermal treatment at a temperature of 1100° C. The cubic structure of the applied material of the film electrolyte is proved by measurements on an X-ray diffractometer. The electrochemical measurements show that the number of oxygen ions' transfers in the manufactured electrolyte is practically equal to 1.

EXAMPLE 10

Figure 8:
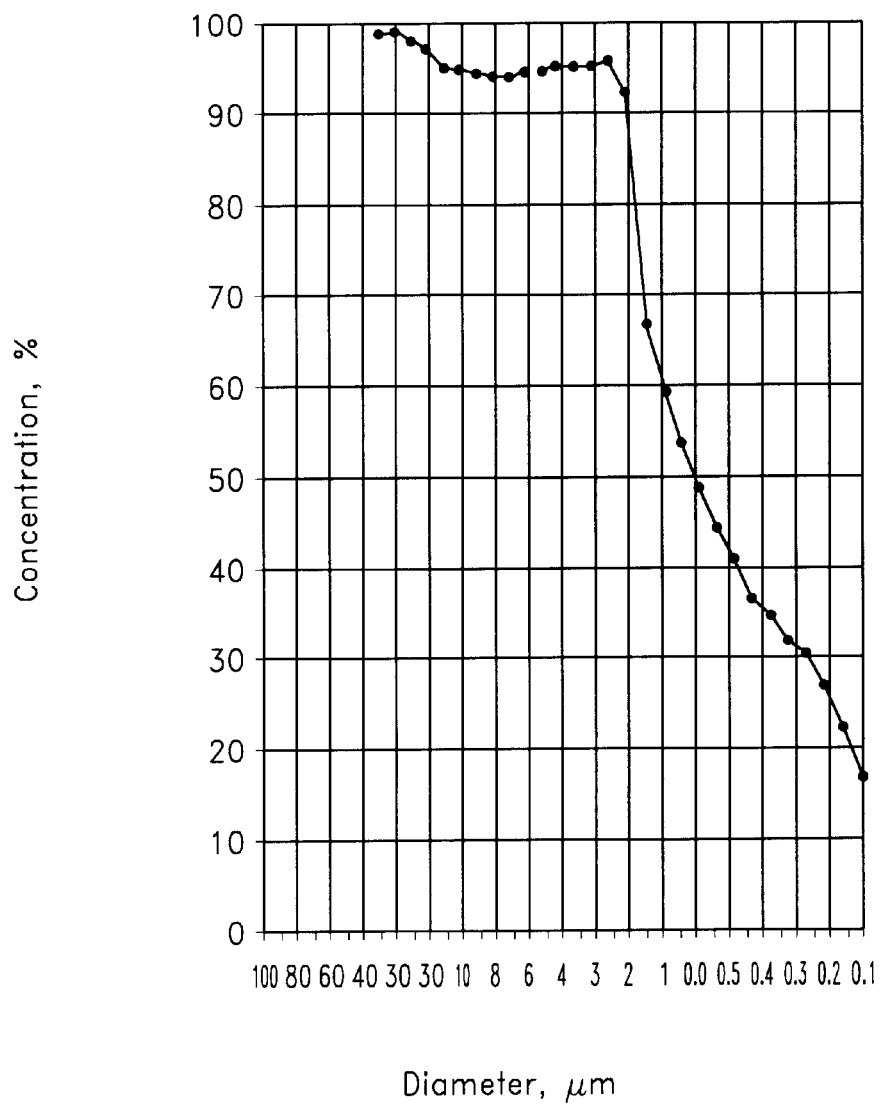
FIG. 8 shows the diagram characterizing the granulometric composition of the YSZ powder.
Figure 9:
FIG. 9 shows the YSZ electrolyte layer over the porous cathode.

One modification of the method for manufacturing the film electrolyte in accordance with example 6 consists of the following: a powder of the stabilized zirconium dioxide is added into the material to be applied onto the surface of the cathode tube, the powder having a composition presented in Table 5 (row 1) in the amount of 1.5% by mass. FIG. 8 shows a fractional composition of the powder to be added, in which 96% of its particles have a diameter less than 2 μm. The technology of applying the electrolyte is similar to the one used in the example 6, but the rate of the thickness growth of the electrolyte layer increases and is approximately 30 to 40 μm per hour. An electrolyte layer fragment of 30.7 μm in thickness, on a porous cathode, is shown in the photo of FIG. 9.

EXAMPLE 11

Manufacturing the Ba—Ce—Gd Electrolyte on the Porous Electrode.

A mixture of the carboxylates with the Ba, Ce and Gd composition corresponding to Table 5, row 3, is prepared similar to the previous examples. The mixture of the carboxylates in the form of a gas-drop emulsion is sprayed onto a porous plate, strontium lanthanum chromite substrate, which is maintained at 380° C. During the carboxylate decomposition, the gas-dense film of the electrolyte having proton conductivity is formed. The rate of film thickness growth is 20 $\mu$m per hour.

Preferred Method for Manufacturing the Cermet Fuel Electrode

To obtain the above mentioned technical result in manufacturing the cermet fuel electrode current methods of manufacturing the cermet fuel electrode are altered. The known method for manufacturing the cermet fuel electrode of the high-temperature fuel cell, comprising a step of forming an electrode cermet layer on the solid electrolyte in contact with the internal air electrode, and consisting of a rough-disperse electron-conductive material selected from the group of the metallic nickel and/or cobalt, is changed to add a rough-disperse ion-conductive material, formed on the basis of doped zirconium dioxide and/or doped cerium oxide; and the subsequent forming of a separate thin-disperse electron-conductive porous multi-phased layer on the rough-disperse layer, consisting of a metallic material selected from the group of the nickel and/or cobalt and ion-conductive doped material on the basis of the cerium oxide. The forming is accomplished by application and subsequent heating of a mixture-paste consisting of the above-mentioned thin-disperse components and a binder; wherein the cermet fuel electrode is manufactured by simultaneous forming of the rough- and thin-disperse components of the porous multi-phased layer by application of the mixture-paste onto the electrolyte which is in contact with the internal air electrode.

EXAMPLE 12

In order to manufacture the cermet fuel electrode, a mixture is prepared of carboxylates $Ni[O_2C—C(CH_3)_2—(CH_2)_n—CH_3]_2$ (where the Ni concentration is 60 g per kg) with a powder of the electrolyte $(ZrO_2)_{0.91}(Y_2O_3)_{0.09}$ (Table 5, row 1) in a 1 to 3 ratio of solid-to-liquid phases. A nickel powder with the proportion $T_{YSZ}/T_N=1/1.1$ is added to this mixture, and the resultant subjected to processing in a planetary mill. The mixture is applied onto the electrolyte surface by painting. Then, the element is placed in a vacuum chamber and is treated at 350° C. and residual pressure of 10 mmHg for three hours. During this, the nickel carboxylate being in the mixture composition decomposes with forming the metallic nickel which binds the particles of the electrolyte powder and previously mixed nickel powder into the single conductive framework. Then the finished element is thermally treated in a furnace at 1100° C.

EXAMPLE 13

Figure 10:
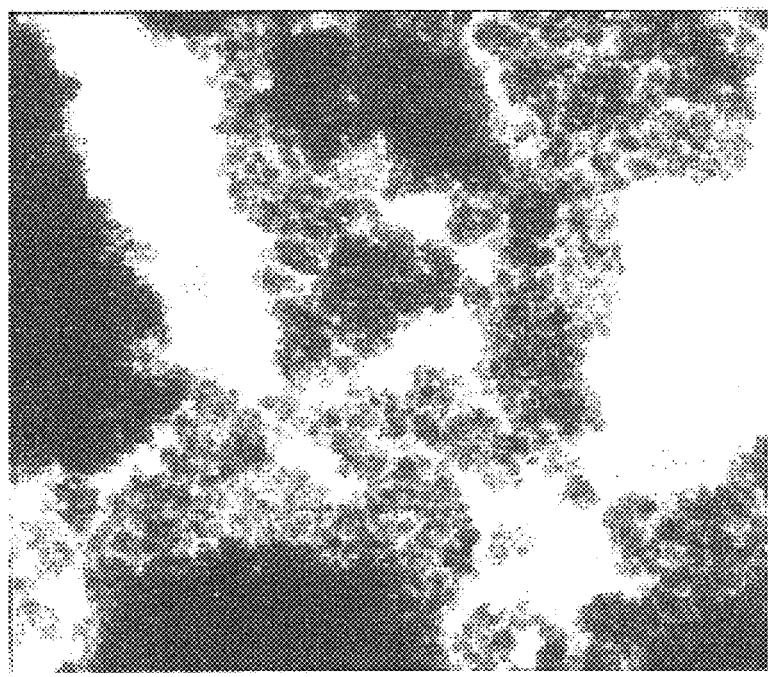
FIG. 10 shows a view of powder $(CeO2)_{0.85}(Sm_2O_3)_{0.15}$ under the 28.000 power.
Figure 11:
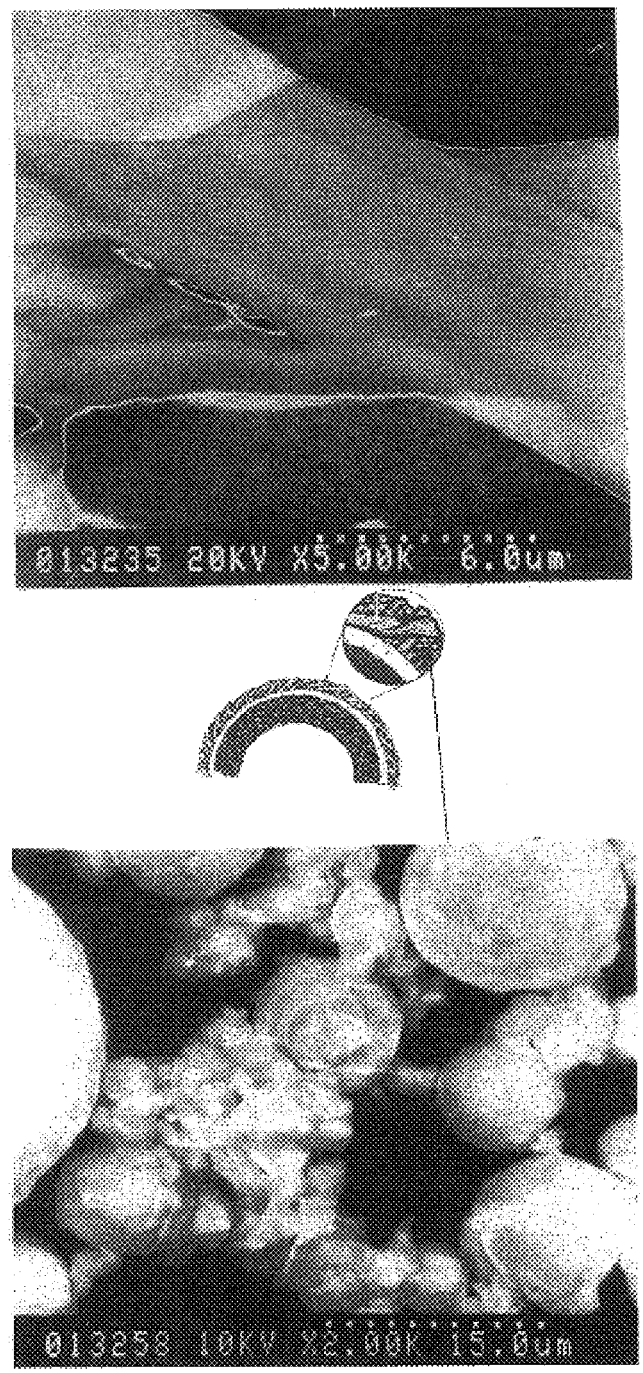
FIG. 11 shows a fuel electrode, where a) is a photo of the thread-like YSZ powder, b) is a structure of the cermet anode, and c) is a photo of spherical particles of nickel powder.

In order to manufacture the highly porous cermet anode on which partial fuel reforming is possible, a mixture-paste is prepared by mixing the powders of the nickel, having particles of regular spherical shape (FIG. 11a), doped zirconium dioxide having particles of a fibrous structure (FIG. 1b), and a thin-disperse powder of the doped cerium oxide (FIG. 10) with the liquid phase of the dimethyl-butyl-acetic cobalt——$Co[O_2C—C(CH_3)_2—(CH_2)_3—CH_3]_3$. This mixture-paste, during the process of thermal treatment, forms an electron-conductive porous multi-phased layer binding the rough- and thin-disperse phases, thus forming the cermet of the fuel electrode.

The cobalt concentration in the carboxylate liquid phase is 56 g per kg. The weight ratio between the metallic nickel powder and the total amount of ion-conductive powders is 1.1/1.0. The ratio between solid and liquid phases contained in the produced paste is within the range of 1/3 to 5/7 mass. Rough-disperse particles of the nickel powder have a diameter ranging from 10 to 15 $\mu$m, while the rough-disperse powder of the YSZ electrolyte has a thread-like shape, where the ratio between the particle length and diameter is no less than 10, with a diameter of threads ranging from 5 to 10 $\mu$m.

90% of the particles in the thin-disperse powder of doped cerium oxide have a diameter less than 1.0 $\mu$m.

The step of applying the mixture-paste is performed by painting in an air medium at room temperature and atmospheric pressure. A half-element with the applied wet mixture-paste is subjected to a thermal treatment in vacuum at 350° C. and residual pressure of 10 mmHg.

Preferred Embodiment of the Invention for Manufacturing the Electrical Insulating Layer An electrical insulating layer between the current passage and the anode, on the electrolyte surface, is the last component manufactured in the HTFC. Its necessity, as it was mentioned above, is to prevent parasitic current coupling between electrodes and to eliminate a <<triple point (fuel gas/electrolyte/cathode) effect >> in locations of the current passage output.

Depending on planar or tubular HTFC construction, conditions and techniques for applying the electrical insulating layer differ. For planar construction, a technique of applying the gas-drop emulsion by masking the adjoining areas is more suitable, while for tubular construction, a method of painting is more suitable. For these applications, preparations of the raw materials for applying the electrical insulating layer are different, however, they result in obtaining an electrically insulating covering of the same chemical composition having the same functional properties.

EXAMPLE 14

In order to manufacture the electrically insulating layer by painting, a dispersion comprising 30% powder material and 70% liquid phase is used. The magnesium spinel of the $MgAl_2O_4$ composition with a 15% addition of the 9YSZ powder is used as the powder material, and a mixture of the Al and Mg carboxylates is used as the liquid phase, where the organic part of the carboxylates is represented by dimethyl-butyl-acetic acid. The weight ratio between the aluminum and magnesium in the mixture of the carboxylates is designed to form, during their calcination, a substance corresponding to the $MgAl_2O_4$ magnesium spinel. The content of the Mg and Al in the carboxylates is presented in Table 1. The dispersion is applied onto the surface being insulated and heated during painting, to no more than 530° C.

TABLE 5

| No | Name of material | Chemical composition molar % |
|----|------------------|------------------------------|
| 1 | Electrolyte with ion oxygen conductivity | $(ZrO_2)_{0.91}(Y_2O_3)_{0.09}$ |
| 2 | Electrolyte with ion oxygen conductivity | $(CeO_2)_{0.85}(Sm_2O_3)_{0.15}$ |
| 3 | Electrolyte with proton conductivity | $BaCe_{0.85}Gd_{0.15}O_3$ |
| 4 | Strontium lanthanum manganite with electron conductivity | $La_{0.7}Sr_{0.3}MnO_3$ |
| 5 | Strontium lanthanum cobalite with mixed conductivity | $La_{0.6}Sr_{0.4}CoO_3$ |
| 6 | Strontium lanthanum chromite with electron conductivity | $La_{0.7}Sr_{0.3}CrO_3$ |
| 7 | Electrical insulating material (magnesium spinel with additions) | $(MgAl_2O_4)_{1-n}*$ $*((ZrO_2)_{0.91}(Y_2O_3)_{0.09})_n$ |

EXAMPLE 15

The method for manufacturing the electrical insulating layer by applying from the gas-drop emulsion is realized as follows: A metal-organic salt of Al and Mg having Mg[Al(Alc)$_4$]$_2$ composition is mixed with the Zr and Y carboxylates, where the organic component is represented by dimethyl-butyl-acetic acid. The zirconium and yttrium carboxylates are added in amount sufficient to form the 5–15% yttrium-stabilized zirconium in the composition of the magnesium spinel following the pyrolysis of the mixture on the heated surface to be electrically insulated. The application step is carried out in the form of a strip of 2 to 3 mm in width. The temperature of the surface to be electrically insulated is maintained at 450° C. As a result, an electrically insulating layer of 12 to 15 µm in thickness, and having a composition corresponding to the chemical formula $(MgAl_2O_4)_{1-n}((ZrO_2)_{0.91}(Y_2O_3)_{0.09})_n$ where n ranges from 5 to 15% by mass, is formed.

Industrial Applicability

The method for manufacturing the single HTFC and its components, i.e. the cathode, electrolyte, anode, current passage, interface layer, and the insulating layer, may be widely used in the technology of manufacturing single HTFCs and their components.

This group of inventions offers a combined approach to the manufacture of the HTFC, and its components, in the form of a single technological process; utilizing a substantially smaller list of materials, substances and reagents. Uniform chemical compounds of metals with organic components of the same class being prepared according to the present group of inventions are used for manufacturing all HTFC components, which allows for the use of substantially one apparatus for forming all components, within limits of the single technological process.

As a result, the cost of a single HTFC and hence of the article as a whole decreases significantly.

What is claimed is:

1. A method for manufacturing a high-temperature fuel cell, comprising:
   manufacturing a cathode;
   applying an interface layer;
   applying a current passage;
   applying at least one electrolyte;
   applying an anode;
   applying an electrical insulating layer; and
   thermally treating a whole construction of the high-temperature fuel cell, wherein after manufacturing the cathode, applying the interface layer, the current passage, the electrolyte, the anode and the electrical insulating layer are performed using the same apparatus, and wherein a metal-organic complex used to manufacture high-temperature fuel cell components to be applied, interfaced, and caked is prepared having the formula:

$[CH_3-(CH_2)_n-C(CH_3)_2-CO_2]Me^{+m}$, where n is from 1 to 7,
   m is a metal valence, and
   Me is a material selected from the group consisting of Mg, Ca, Sr, Ba, Al, Sc, Y, In, La and lanthanides, Ti, Zr, Hf, Cr, Mn, Fe, Co, Ni, Cu, and the oxides of said metals for forming the cathode, the anode, the current passage, the electrolyte, the interface and electrical insulating layers.

2. The method according to claim 1 wherein, in the step of manufacturing the cathode, said metal-organic complexes are used as a binding material, as a plasticizer and a pore-forming agent simultaneously while mixing the cathode mass to be formed.

3. The method according to claim 1, wherein said metal-organic complex is used as a liquid phase of organic carriers for thin-disperse solid phases of corresponding powder materials in order to manufacture the current passages, the electrolytes, the interface and the electrical insulating layers.

4. The method according to claim 1, wherein the metal-organic complex is used in a liquid phase to prepare a mixture-paste, said mixture-paste including rough and thin dispersions of ion- and electron-conductive corresponding powder materials to manufacture a cermet of the anode.

5. The method according to claim 1, wherein said metal-organic complex is used directly as the liquid phase.

6. The method according to claim 1, wherein said manufacturing of the cathode of a high-temperature fuel cell, comprises:
   jointly precipitating carbonates from a solution of lanthanum nitrate and manganese nitrate, thereby synthesizing a powder of an electrode material comprising a doped lanthanum manganite;
   preparing a formable mass by isostatic compacting of a composition comprising said powder and an organic binding component, wherein said binding component comprises at least one carboxylate of a chemical element selected from the group consisting of La, Mn, Ni, Cr and Co, said chemical element being doped with an alkaline-earth element; and
   heating said formable mass to form a carrier substrate at a temperature not higher than 1380° C.

7. A method for manufacturing a carrier ceramic cathode of a high-temperature fuel cell, comprising:
   jointly precipitating carbonates from a solution of lanthanum nitrate and manganese nitrate, thereby synthesizing a powder of an electrode material comprising a doped lanthanum manganite;
   preparing a formable mass by isostatic compacting of a composition comprising said powder and an organic binding component, wherein said binding component comprises at least one carboxylate of a chemical element selected from the group consisting of La, Mn, Ni, Cr and Co, said chemical element being doped with an alkaline-earth element; and heating said formable mass to form a carrier substrate at a temperature not higher than 1380° C. in order to achieve the caking without shrinkage of cathodes, wherein said cathodes are made from the powder of the electrode material described by the formula $La_xA_{1-x}MnO_3$ where A is either Mg, or Ca, or Sr, or Ba or their mixture $0.6<x<1.0$.

8. The method according to claim 6, wherein; acids with a common formula $C_nH_{2n+1}O_2$ where n is $C_6$ to $C_{12}$, are used to prepare the organic binding component comprising said at least one carboxylate.

9. The method according to claim 6, wherein the sum concentration of metals in the composition of the carboxylates is from 20 to 360 g per kg.

10. The method according to claim 6, wherein the mass of the organic binding components is 3 to 15% relative to the formable mass.

11. The method according to claim 7, wherein the powder of the electrode material is mixed with the organic binding component comprising Mn and La, or Co and La, or Cr and La, or Ni and La, doped by elements from the group of alkaline-earth elements, wherein the binding component generates, after its decomposition, compounds selected from the group consisting of $La_ySr_{1-y}MnO_3$, or $La_ySr_{l-y}CrO_3$, or $La_ySr_{1-y}CrO_3$, or $La_ySr_{l-y}NiO$, where $0.6<y<1.0$.

12. A method for manufacturing a solid oxide electrolyte of the high-temperature fuel cell, comprising:

preparing an initial metal-organic compound using the reaction:

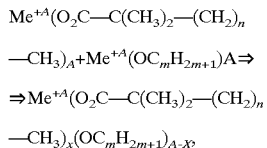

whereby obtaining a mixture comprising components selected from the group consisting of metal carboxylates and metal alcoholates, having the formula:

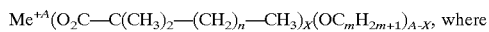

Me is a metal included in any functional component of the high-temperature fuel cell;

A is the valence of said metal;

X is a coefficient determined from the following inequality: $0<X<A$;

n is from 1 to 7; and m is from 2 to 8;

heating a ceramic electrode up to a temperature not exceeding about 550° C;

applying the metal-organic compound onto a surface of the ceramic electrode; and thermally treating the electrode with the formed electrolyte;

thereby obtaining a film of the solid oxide electrolyte of the high-temperature fuel cell.

13. The method for manufacturing the solid oxide electrolyte according to claim 12, wherein mixing of the initial components in the step of preparing the metal-organic compound is performed at the temperature of 80° to 100° C.

14. The method for manufacturing the solid oxide electrolyte according to claim 12, wherein the step of synthesizing the metal carboxylates having the common formula:

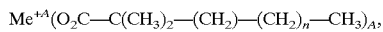

is performed by extraction of corresponding metals ($Me^+_A$) from water solutions comprising materials selected from the group consisting of salts of the corresponding metals and suspensions of the corresponding metals in mineral acids.

15. The method for manufacturing the solid oxide electrolyte according to claim 12, wherein the step of synthesizing a zirconium alcoholate alcoholate $Zr(OC_mH_{2m+1})_4$ is performed during the interaction of a zirconium mineral salt with an alcohol and a metallic calcium during boiling.

16. The method for manufacturing the solid oxide electrolyte according to claim 15, wherein the metal-organic compound comprising zirconium is doped by at least one element selected from the group consisting of Mg, Ca, Sc, Y, Ce and lanthanides, and wherein said metal-organic compound is applied onto the surface of a carrier cathode by a method selected from the group consisting of rolling, painting, and spraying a gas-liquid emulsion, and applying the prepared composition along the cathode surface at a temperature of the heated cathode 400 to 550° C.

17. The method of claim 16, wherein the step of applying the metal-organic compound onto the heated surface of the ceramic cathode is performed with the growth rate of film thickness of 10 to 25 μm per hour.

18. The method for manufacturing the solid oxide electrolyte according to claim 14, wherein the metal-organic compound modified by at least one element selected from the group consisting of Mg, Ca, Sc, Y, and lanthanides, is applied onto the electrode surface heated up to the temperature not higher than 550° C.

19. The method for manufacturing the solid oxide electrolyte according claim 15, wherein the metal-organic compound comprising zirconium is applied onto the electrode surface heated up to the temperature of between about 300° and about 400° C.

20. The method for manufacturing the solid oxide electrolyte according to claim 12, further comprising adding a powder of a modified zirconium dioxide to the metal-organic compound before applying said metal-organic compound to the surface of the electrode, thereby increasing a rate of obtaining said film.

21. The method for manufacturing the solid oxide electrolyte according to claim 20, wherein the powder of the modified zirconium dioxide comprises about 95% of particles having a size less than 2 μm, and wherein amount in the resulting mixture is between about 0.1 and about 2.0% by mass.

22. The method for manufacturing the solid oxide electrolyte according to claim 12, wherein the step of applying the metal-organic compound onto the heated surface of the ceramic electrode in performed in an inert medium.

23. The method-of claim 12, wherein said electrolyte is a proton electrolyte, wherein said mixture comprises at least one material of the chemical formula selected from the group consisting of $SrCe_{0.85}Gd_{0.15}[O_2C—C(CH_3)_2—(CH_2)_n—CH_3]_6$ and $BaCe_{0.85}Gd_{0.15}(O_2C—C(CH_3)_2—(CH_2)_n—CH_3)_6$, where n is 2 to 3, and wherein said mixture is applied onto the electrode surface heated up to the temperature not higher than 470°, thereby forming a film of the proton electrolyte of the chemical formula selected from the group consisting of of $SrCeO_{0.85}Gd_{0.15}O_3$ and $BaCeO_{0.85}Gd_{0.15}O_3$.

24. The method for manufacturing the solid oxide electrolyte according to claim 12, wherein, after applying the prepared metal-organic compound onto the heated surface of the electrode, the obtained half-element is subjected to the thermal treatment at the temperature not higher than 1250° C.

25. A method for manufacturing a current passage of a high-temperature fuel cell, comprising:
   synthesizing a powder of an electron-conductive material comprising doped lanthanum chromite;
   producing an ultra-disperse mixture from the synthesized powder in organic carriers; and
   applying the ultra-disperse mixture from the synthesized powder in organic carriers on the carrier cathode with thermal treatment, wherein the thin dispersion is produced by grinding the synthesized powder of the electron-conductive material of the doped lanthanum chromite until the ultra-disperse condition in the liquid medium of the mixture of metal-organic complexes of chrome, lanthanum and doping elements wherein said metal-organic complexes have the formula:

   $[CH_3-(CH_2)_n-C(CH_3)_2-CO_2]Me^{+m}$, where n is from 1 to 7,
   m is a metal valence, and
   Me is a material selected from the group consisting of Mg, Ca, Sr, Ba, Al, Sc, Y, In, La and lanthanides, Ti, Zr, Hf, Cr, Mn, Fe, Co, Ni, Cu, and the oxides of said metals, and wherein the current passage film is manufactured by multiple steps of applying the thin dispersion onto the surface of the carrier cathode heated up to the temperature of forming, of a gas-dense film of the doped lanthanum chromite of the composition similar to the thin-disperse powder synthesized individually.

26. The method according to claim 25, wherein said organic carriers are synthesized comprising the formula:

$Me+M(O_2C-C(CH_3)_2-(CH_2)_n-CH_3)_M$, where:

Me is a metal selected from the group consisting of Cr, La, Sr, Ca, and Mg;
   M is a metal valence.

27. The method according to claim 25, wherein a ratio between solid and liquid phases in the prepared thin dispersion is from 1/100 to 15/100 mass.

28. The method according to claim 25, wherein the liquid mixture of of metal-organic complexes of chrome, lanthanum and doping elements comprises Cr, La, Sr, Mg, or Ca and wherein the concentration of Cr, La, Sr, Mg, Ca in said mixture is from 20 to 110 g per kg.

29. The method according to claim 25, wherein the step of applying the ultra-disperse mixture from the synthesized powder in organic carriers is performed by painting at the atmospheric pressure in an air medium.

30. The method according to claim 25, wherein the step of applying the ultra-disperse mixture from the synthesized powder in organic carriers is performed by spraying said mixture in an inert medium.

31. A method for manufacturing a current passage of a high-temperature fuel cell, comprising:
   synthesizing a powder of an electron-conductive material comprising doped lanthanum chromite;
   producing an ultra-disperse mixture from the synthesized powder in organic carriers; and
   applying the powder on the carrier cathode with thermal treatment, wherein the thin dispersion is produced by grinding the synthesized powder of the electron-conductive material of the doped lanthanum chromite until the ultra-disperse condition in the liquid medium of the mixture of metal-organic complexes of chrome, lanthanum and doping elements, wherein said metal-organic complexes have the formula:

   $[CH_3-(CH_2)_n-C(CH_3)_2-CO_2]Me^{+m}$, where n is from 1 to 7,
   m is a metal valence, and
   Me is a material selected from the group consisting of Mg, Ca, Sr, Ba, Al, Sc, Y, In, La and lanthanides, Ti, Zr, Hf, Cr, Mn, Fe, Co, Ni, Cu, and the oxides of said metals, and
   wherein the current passage film is manufactured by multiple steps of applying the thin dispersion onto the surface of the carrier cathode heated up to the temperature of forming, from the mixture of metal-organic complexes of chrome, lanthanum and doping elements, a gas-dense film of the doped lanthanum chromite of the composition similar to the thin-disperse powder synthesized individually, wherein the rate of thickness growth of the gas-dense film of the current passage on the surface of the carrier porous cathode is no less than 60 $\mu$m per hour.

32. The method according to claim 25, wherein the temperature of forming the current passage from the doped lanthanum chromite on the surface of the carrier cathode does not exceed 600° C.

33. A method for manufacturing an interface layer of a high-temperature fuel cell, comprising:
   synthesizing a metal-organic complex;
   applying the metal-organic complex onto a heated substrate, thereby obtaining a gas-dense film of said interface layer, wherein said metal-organic complex comprises a formula:

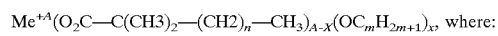
   $Me^{+A}(O_2C-C(CH3)_2-(CH2)_n-CH_3)_{A-X}(OC_mH_{2m+1})_X$, where:

Me is a metal selected from the group consisting of Cr, Mn, Co, Ni, Cu, Y, Zr, La and lanthanides, Mg, Ca, Sr, and Ba;
   A is the valence of the given chemical element (metal);
   X is a coefficient determined from the following inequality: 0<X<A:
   n is from 1 to 7; and
   m is from 2 to 8.

34. The method according to claim 33, wherein
   X is equal to 0; and
   Me is a metal selected from the group consisting of Mg, Ca, Sr, Ba, Ce, Pr, Sm, G, and Er.

35. The method according to claim 33, wherein a total content of metals in a mixture of compounds is not higher than 20 g per kg.

36. A method for manufacturing an interface layer, comprising:
   synthesizing a metal-organic complex;
   applying the metal-organic complex onto a heated substrate, said metal-organic complex comprising the formula:

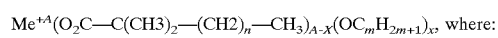
   $Me^{+A}(O_2C-C(CH3)_2-(CH2)_n-CH_3)_{A-X}(OC_mH_{2m+1})_X$, where:

Me is a metal selected from the group consisting of Cr, Mn, Co, Ni, Cu, Y, Zr, La and lanthanides, Mg, Ca, Sr, and Ba;
   A is the valence of the given chemical element (metal);
   X is a coefficient determined from the following inequality: 0<X<A:
   n is from 1 to 7; and m is from 2 to 8, wherein said heated substrate is heated up to a temperature not higher than 530° C. in the air atmosphere, thereby forming a gas-dense film of the interface layer of a doped lanthanum chromite of no greater than 0.6 µm in thickness.

37. The method according to claim 33, wherein

X is equal to 0,

Me is a metal selected from the group consisting of Ce and doping elements Sm, Gd; and n is from 1 to 2.

38. The method according to claim 37, wherein the total content of metals in the mixture of compounds is not higher than 20 g per kg.

39. A method for manufacturing an interface layer of a high-temperature fuel cell, comprising:

synthesizing a metal-organic complex;

applying the metal-organic complex onto a heated substrate, said metal-organic complex comprising the formula:

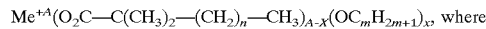
$Me^{+A}(O_2C-C(CH_3)_2-(CH_2)_n-CH_3)_{A-X}(OC_mH_{2m+1})_X$, where

A is the valence of the metal;

m is from 2 to 8,

X is equal to 0;

Me is a metal selected from the group consisting of Ce and doping elements Sm, Gd; and n is from 1 to 2; and wherein a mixture of metal-organic comulexes is applied onto a substrate heated up to a temperature not higher than 380°C. in an atmosphere of an inert gas, thereby forming a gas-dense anti-diffusive film of the interface layer of not greater than 10 µm in thickness on the surface of a doped cerium oxide.

40. The method according to claim 33, wherein in order to manufacture the interface layer protecting a previous layer from a restorative gas medium, a mixture of compounds is used comprising the formula:

$Me^{+A}(O_2C-C(CH_3)_2-(CH_2)_n-CH_3)_{A-X}(OC_mH_{2m+1})_X$, where

Me is a metal selected from the group consisting of Zr, Y, La and lanthanides;

A is the valence of the metal; and

X is an integer from 1 to A.

41. The method according to claim 40, wherein the total content of the zirconium and doping elements in the mixture is not higher than 50 g per kg.

42. A method for manufacturing an interface layer of a high-temperature fuel cell, comprising:

synthesizing a metal-organic complex;

applying the metal-organic complex onto a heated substrate, said metal-organic complex comprising the formula:

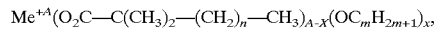
$Me^{+A}(O_2C-C(CH_3)_2-(CH_2)_n-CH_3)_{A-X}(OC_mH_{2m+1})_X$, where:

n is from 1 to 7; and m is from 2 to 8,

Me is a metal selected from the group consisting of Zr, Y, La and lanthanides;

A is the valence of the metal; and

X is an integer from 1 to A; and applying a mixture of said metal-organic complexes by painting the substrate heated up to the temperature not higher than 430° C. in the atmosphere of an inert gas, thereby forming a protective interface layer of not greater than 5 µm in thickness on the surface of the doped zirconium dioxide.

43. The method according to claim 42, wherein the atmosphere of the inert gas is selected from the group consisting of Ar, $N_2$, and $CO_2$.

44. A method for manufacturing a cermet fuel electrodes of a high-temperature fuel cell, comprising:

forming, on a solid electrolyte in the contact with an internal air electrode, a first cermet layer of the electrode comprising a rough-disperse electron-conductive material selected from the group consisting of metallic nickel and cobalt, and a rough-disperse ion-conductive material based on a the doped Zirconium dioxide or doped Cerium oxide; and forming, on the rough-disperse layer, a separate thin-disperse electron-conductive porous multi-phased layer comprising a metallic material selected from the group consisting of the nickel and cobalt, and ion-conductive doped material comprising cerium oxide by applying and subsequent heating a mixture-paste consisting of the thin-disperse components with a binder onto said solid electrolyte, wherein a cermet fuel electrode is manufactured by steps of simultaneous forming the rough- and thin-disperse components of the porous multi-phased layer, and wherein the mixture-paste is prepared by mixing the powders of the rough-disperse electron-conductive material with the rough-disperse ion-conductive material comprising electrolyte, thin-disperse ion-conductive material comprising doped cerium oxide, and liquid phase of metal carboxylates selected from the group consisting of nickel carboxylate and cobalt carboxylate, said liquid phase comprising the formula:

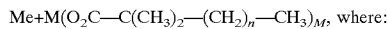
$Me+M(O_2C-C(CH_3)_2-(CH_2)_n-CH_3)_M$, where:

Me is selected from the group consisting of Ni, and Co;

m is a metal valence;

n is from 1 to 7; and thereby said paste during the thermal treatment form[s]ing the electron-conductive porous multi-phased layer binding to each other the rough- and thin-disperse vhases forming the cermet of the fuel electrode.

45. The method according to claim 44, wherein a ratio of solid and liquid phases in the produced paste is within the range from 1/3 to 5/7.

46. The method according to claim 44, wherein a concentration of metal selected from the group consisting of nickel and cobalt in said liquid phase of metal carboxylates is from 20 to 70 g per kg of the carboxylate.

47. The method according to claim 44, wherein the metal powder selected from the group consisting of nickel and cobalt is added in the ratio of the metal powder to the electrolyte of 1.1/1.0.

48. The method according to claim 44, wherein the rough-disperse particles of the metallic material selected from the group consisting of nickel powder and cobalt powder have a regular spherical structure with a diameter of 10 to 15 µm.

49. The method according to claim 44, wherein the synthesized rough-disperse electrolyte powder has a thread-like shape, and the ratio between the length and diameter of the particle is no less than 10:1, when the particle diameter is 5 to 10 µm.

50. The method according to claim 44, wherein the thin-disperse powder of the doped cerium oxide contains no less than 96% of particles having a diameter less than 2.0 μm.

51. The method according to claim 44, wherein the step of applying the mixture-paste onto the solid electrolyte is performed by painting in the air medium at room temperature and an atmospheric pressure.

52. The method according to claim 44, wherein the the solid electrolyte with the applied wet mixture-paste is subjected to a thermal treatment in a vacuum at a temperature not higher than 400° C. and a residual pressure not greater than 0.1 atmosphere.

53. A method for manufacturing an electrical insulating layer of a high-temperature fuel cell, comprising applying a mixture of metal-organic complexes onto a surface to be insulated, said mixture comprising the formula:

$Me^{+A}[(O_2C-C(CH_3)_2-(CH_2)_n-CH_3)_{1-X}(OC_mH_{2m+1})_x]_A$, where:

n is from 1 to 7;

m is from 2 to 8;

Me is a metal selected from the group consisting of Mg, Al, Zr, Y, Ca, La and lanthanides;

A is the metal valence; and

X is from 0 to 1.

54. The method according to claim 53, wherein said surface to be insulated is heated up to a temperature not higher than 600° C.

55. The method of claim 1, wherein the electrolyte is selected from the group consisting of doped cerium oxide and doped zirconium oxide.

* * * * *

UNITED STATES PATENT AND TRADEMARK OFFICE
CERTIFICATE OF CORRECTION

PATENT NO. : 6,875,532 B2
DATED : April 5, 2005
INVENTOR(S) : Gorina et al.

It is certified that error appears in the above-identified patent and that said Letters Patent is hereby corrected as shown below:

Title page,
Item [12], please delete "Gorina et al." and insert therefore -- Sevastyanov et al --.
Item [76], Inventors, please delete "Liliya Fedorovna Gorina, 109439, ul. Yolgigradskii prospect, 140-2-26 Moscow (RU)."

Signed and Sealed this

Twenty-eighth Day of June, 2005

JON W. DUDAS
*Director of the United States Patent and Trademark Office*